(12) United States Patent
Fujisaki

(10) Patent No.: US 8,121,587 B1
(45) Date of Patent: *Feb. 21, 2012

(54) COMMUNICATION DEVICE

(76) Inventor: Iwao Fujisaki, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/901,497

(22) Filed: Oct. 9, 2010

Related U.S. Application Data

(63) Continuation of application No. 11/623,061, filed on Jan. 13, 2007, which is a continuation of application No. 10/905,365, filed on Dec. 30, 2004, now abandoned.

(60) Provisional application No. 60/521,265, filed on Mar. 23, 2004.

(51) Int. Cl.
*H04M 3/00* (2006.01)

(52) U.S. Cl. ..... 455/418; 370/486; 370/487; 455/404.2; 455/456.1; 455/457; 455/456.2; 455/456.3; 455/456.4; 455/456.5; 455/456.6; 455/414.1; 455/412.2; 455/566; 455/158.4; 455/158.5; 709/214; 709/216; 709/242

(58) Field of Classification Search ............... 370/486, 370/487; 455/418, 404.2, 456.1, 456.2, 456.3, 455/456.4, 456.5, 456.6, 457, 414.1, 412.2, 455/566, 158.4, 158.5; 709/214, 216, 242

See application file for complete search history.

(56) References Cited

U.S. PATENT DOCUMENTS

| | | | |
|---|---|---|---|
| 4,934,773 A | 6/1990 | Becker | |
| 4,937,570 A | 6/1990 | Matsukawa et al. | |
| 5,113,427 A | 5/1992 | Ryoichi et al. | |
| 5,272,638 A | 12/1993 | Martin et al. | |
| 5,353,376 A | 10/1994 | Oh et al. | |
| 5,388,147 A | 2/1995 | Grimes | |
| 5,404,579 A | 4/1995 | Obayashi et al. | |
| 5,405,152 A | 4/1995 | Katanics et al. | |
| 5,414,461 A | 5/1995 | Kishi et al. | |
| 5,446,904 A | 8/1995 | Belt et al. | |
| 5,532,741 A | 7/1996 | Tsutsumi | |
| 5,542,557 A | 8/1996 | Koyama et al. | |
| 5,543,789 A | 8/1996 | Behr et al. | |
| 5,559,554 A | 9/1996 | Uekane et al. | |
| 5,648,768 A | 7/1997 | Bouve | |
| 5,675,630 A | 10/1997 | Beatty | |
| 5,687,331 A | 11/1997 | Volk et al. | |
| 5,732,383 A | 3/1998 | Foladare et al. | |
| 5,772,586 A | 6/1998 | Heinonen et al. | |
| 5,778,304 A | 7/1998 | Grube et al. | |
| 5,802,460 A | 9/1998 | Parvulescu et al. | |
| 5,805,672 A | 9/1998 | Barkat et al. | |

(Continued)

FOREIGN PATENT DOCUMENTS

JP  H11/195137 A1  7/1999

(Continued)

OTHER PUBLICATIONS

HI Corporation's company history (http://www.hicorp.co.jp/english/corporate/history.html).

*Primary Examiner* — Patrick Edouard
*Assistant Examiner* — Shantell L Heiber

(57) ABSTRACT

The communication device which implements a voice communicating function, an attached file emailing function, a geographic location function, a dictionary function, a schedule notifying function, a multiple type TV program function, a multiple TV screen displaying function, a touch panel function, a communication device finding function, and a voice message displaying function, independently or simultaneously.

3 Claims, 1 Drawing Sheet

U.S. PATENT DOCUMENTS

| | | |
|---|---|---|
| 5,812,930 A | 9/1998 | Zavrel |
| 5,844,824 A | 12/1998 | Newman et al. |
| 5,902,349 A | 5/1999 | Endo et al. |
| 5,916,024 A | 6/1999 | Von Kohorn |
| 5,918,180 A | 6/1999 | Dimino |
| 5,959,661 A | 9/1999 | Isono |
| 6,009,336 A | 12/1999 | Harris et al. |
| 6,011,973 A | 1/2000 | Valentine et al. |
| 6,043,752 A | 3/2000 | Hisada et al. |
| 6,081,265 A | 6/2000 | Nakayama et al. |
| 6,115,597 A | 9/2000 | Kroll et al. |
| 6,128,594 A | 10/2000 | Gulli et al. |
| 6,144,848 A | 11/2000 | Walsh et al. |
| 6,148,212 A | 11/2000 | Park et al. |
| 6,161,134 A | 12/2000 | Wang et al. |
| 6,192,343 B1 | 2/2001 | Morgan et al. |
| 6,198,942 B1 | 3/2001 | Hayashi et al. |
| 6,202,060 B1 | 3/2001 | Tran |
| 6,216,013 B1 | 4/2001 | Moore et al. |
| 6,216,158 B1 | 4/2001 | Luo et al. |
| 6,222,482 B1 | 4/2001 | Gueziec |
| 6,223,029 B1 | 4/2001 | Stenman et al. |
| 6,225,944 B1 | 5/2001 | Hayes |
| 6,236,832 B1 | 5/2001 | Ito |
| 6,243,039 B1 | 6/2001 | Elliot |
| 6,249,720 B1 | 6/2001 | Kubota et al. |
| 6,253,075 B1 | 6/2001 | Beghtol et al. |
| 6,265,988 B1 | 7/2001 | LeMense et al. |
| 6,285,317 B1 | 9/2001 | Ong |
| 6,292,666 B1 | 9/2001 | Siddiqui et al. |
| 6,292,747 B1 | 9/2001 | Amro et al. |
| 6,311,011 B1 | 10/2001 | Kuroda |
| 6,311,077 B1 | 10/2001 | Bien |
| 6,332,122 B1 | 12/2001 | Ortega et al. |
| 6,333,684 B1 | 12/2001 | Kang |
| 6,363,320 B1 | 3/2002 | Chou |
| 6,366,651 B1 | 4/2002 | Griffith et al. |
| 6,366,782 B1 | 4/2002 | Fumarolo et al. |
| 6,374,221 B1 | 4/2002 | Haimi-Cohen |
| 6,385,466 B1 | 5/2002 | Hirai et al. |
| 6,385,541 B1 | 5/2002 | Blumberg et al. |
| 6,405,033 B1 | 6/2002 | Kennedy, III et al. |
| 6,411,198 B1 | 6/2002 | Hirai et al. |
| 6,411,822 B1 | 6/2002 | Kraft |
| 6,415,138 B2 | 7/2002 | Sirola et al. |
| 6,421,470 B1 | 7/2002 | Nozaki et al. |
| 6,421,602 B1 | 7/2002 | Bullock et al. |
| 6,430,498 B1 | 8/2002 | Maruyama et al. |
| 6,442,404 B1 | 8/2002 | Sakajiri |
| 6,445,802 B1 | 9/2002 | Dan |
| 6,477,387 B1 | 11/2002 | Jackson et al. |
| 6,486,867 B1 | 11/2002 | Kopp et al. |
| 6,487,422 B1 | 11/2002 | Lee |
| 6,512,919 B2 | 1/2003 | Ogasawara |
| 6,519,566 B1 | 2/2003 | Boyer et al. |
| 6,526,293 B1 | 2/2003 | Matsuo |
| 6,529,742 B1 | 3/2003 | Yang |
| 6,532,035 B1 | 3/2003 | Saari et al. |
| 6,538,558 B2 | 3/2003 | Sakazume et al. |
| 6,542,750 B2 | 4/2003 | Hendrey et al. |
| 6,542,814 B2 | 4/2003 | Polidi et al. |
| 6,553,310 B1 | 4/2003 | Lopke |
| 6,567,745 B2 | 5/2003 | Fuchs et al. |
| 6,567,984 B1 | 5/2003 | Allport |
| 6,600,975 B2 | 7/2003 | Moriguchi et al. |
| 6,606,504 B1 | 8/2003 | Mooney et al. |
| 6,611,753 B1 | 8/2003 | Millington |
| 6,615,186 B1 | 9/2003 | Kolls |
| 6,618,704 B2 | 9/2003 | Kanevsky et al. |
| 6,622,018 B1 | 9/2003 | Erekson |
| 6,631,271 B1 | 10/2003 | Logan |
| 6,647,251 B1 | 11/2003 | Siegle et al. |
| 6,650,877 B1 | 11/2003 | Tarbouriech et al. |
| 6,650,894 B1 | 11/2003 | Berstis et al. |
| 6,658,272 B1 | 12/2003 | Lenchik et al. |
| 6,658,461 B1 | 12/2003 | Mazo |
| 6,662,023 B1 | 12/2003 | Helle |
| 6,681,120 B1 | 1/2004 | Kim |
| 6,690,932 B1 | 2/2004 | Barnier et al. |
| 6,701,148 B1 | 3/2004 | Wilson et al. |
| 6,707,942 B1 | 3/2004 | Cortopassi et al. |
| 6,711,399 B1 | 3/2004 | Granier |
| 6,725,022 B1 | 4/2004 | Clayton et al. |
| 6,728,531 B1 | 4/2004 | Lee et al. |
| 6,738,643 B1 | 5/2004 | Harris |
| 6,738,711 B2 | 5/2004 | Ohmura et al. |
| 6,763,226 B1 | 7/2004 | McZeal, Jr. |
| 6,772,174 B1 | 8/2004 | Pettersson |
| 6,779,030 B1 | 8/2004 | Dugan et al. |
| 6,788,928 B2 | 9/2004 | Kohinata et al. |
| 6,795,715 B1 | 9/2004 | Kubo et al. |
| 6,812,954 B1 | 11/2004 | Priestman et al. |
| 6,819,939 B2 | 11/2004 | Masamura |
| 6,820,055 B2 | 11/2004 | Saindon et al. |
| 6,836,654 B2 | 12/2004 | Decotignie |
| 6,865,372 B2 | 3/2005 | Mauney et al. |
| 6,870,828 B1 | 3/2005 | Giordano, III |
| 6,883,000 B1 | 4/2005 | Gropper |
| 6,891,525 B2 | 5/2005 | Ogoro |
| 6,895,084 B1 | 5/2005 | Saylor et al. |
| 6,895,256 B2 | 5/2005 | Harma et al. |
| 6,895,259 B1 | 5/2005 | Blank nee Keller et al. |
| 6,898,321 B1 | 5/2005 | Knee et al. |
| 6,898,765 B2 | 5/2005 | Matthews, III et al. |
| 6,901,383 B1 | 5/2005 | Ricketts et al. |
| 6,904,298 B2 | 6/2005 | Arai et al. |
| 6,912,544 B1 | 6/2005 | Weiner |
| 6,922,630 B2 | 7/2005 | Maruyama et al. |
| 6,937,868 B2 | 8/2005 | Himmel et al. |
| 6,947,728 B2 | 9/2005 | Tagawa et al. |
| 6,954,645 B2 | 10/2005 | Tsai et al. |
| 6,958,675 B2 | 10/2005 | Maeda et al. |
| 6,961,559 B1 | 11/2005 | Chow et al. |
| 6,968,184 B2 | 11/2005 | Criss et al. |
| 6,968,206 B1 | 11/2005 | Whitsey-Anderson |
| 6,970,178 B2 | 11/2005 | Tanioka et al. |
| 6,992,699 B1 | 1/2006 | Vance et al. |
| 6,999,802 B2 | 2/2006 | Kim |
| 7,003,598 B2 | 2/2006 | Kavanagh |
| 7,007,239 B1 | 2/2006 | Hawkins et al. |
| 7,012,999 B2 | 3/2006 | Ruckart |
| 7,028,077 B2 | 4/2006 | Toshimitsu et al. |
| 7,030,880 B2 | 4/2006 | Tanioka et al. |
| 7,035,666 B2 | 4/2006 | Silberfenig et al. |
| 7,058,356 B2 | 6/2006 | Slotznick |
| 7,076,052 B2 | 7/2006 | Yoshimura |
| 7,081,832 B2 | 7/2006 | Nelson et al. |
| 7,085,739 B1 | 8/2006 | Winter et al. |
| 7,089,298 B2 | 8/2006 | Nyman et al. |
| 7,106,846 B2 | 9/2006 | Nguyen et al. |
| 7,117,152 B1 | 10/2006 | Mukherji et al. |
| 7,117,504 B2 | 10/2006 | Smith et al. |
| 7,126,951 B2 | 10/2006 | Belcea et al. |
| 7,127,238 B2 | 10/2006 | Vandermeijden et al. |
| 7,127,271 B1 | 10/2006 | Fujisaki |
| 7,130,630 B1 | 10/2006 | Enzmann et al. |
| 7,142,810 B2 | 11/2006 | Oesterling |
| 7,142,890 B2 | 11/2006 | Irimajiri et al. |
| 7,190,880 B2 | 3/2007 | Cookson et al. |
| 7,218,916 B2 | 5/2007 | Nonami |
| 7,224,851 B2 | 5/2007 | Kinjo |
| 7,233,795 B1 | 6/2007 | Ryden |
| 7,239,742 B2 | 7/2007 | Ohtani et al. |
| 7,251,255 B1 | 7/2007 | Young |
| 7,260,416 B2 | 8/2007 | Shippee |
| 7,266,186 B1 | 9/2007 | Henderson |
| 7,274,952 B2 | 9/2007 | Hayashi |
| 7,346,373 B2 | 3/2008 | Kim |
| 7,426,264 B1 | 9/2008 | Henderson |
| 7,489,768 B1 | 2/2009 | Strietzel |
| 7,551,899 B1 | 6/2009 | Nicolas et al. |
| 7,707,602 B2 | 4/2010 | Cragun et al. |
| 2001/0000249 A1 | 4/2001 | Oba et al. |
| 2001/0005826 A1 | 6/2001 | Shibuya |
| 2001/0011293 A1 | 8/2001 | Murakami et al. |
| 2001/0029425 A1 | 10/2001 | Myr |
| 2001/0035829 A1 | 11/2001 | Yu et al. |

| | | | | | |
|---|---|---|---|---|---|
| 2001/0037191 A1 | 11/2001 | Furuta et al. | 2003/0061606 A1 | 3/2003 | Hartwig et al. |
| 2001/0041590 A1 | 11/2001 | Silberfenig et al. | 2003/0063732 A1 | 4/2003 | Mcknight |
| 2002/0002705 A1 | 1/2002 | Byrnes et al. | 2003/0065784 A1 | 4/2003 | Herrod |
| 2002/0004701 A1 | 1/2002 | Nakano | 2003/0065805 A1 | 4/2003 | Barnes, Jr. |
| 2002/0006804 A1 | 1/2002 | Mukai et al. | 2003/0069693 A1 | 4/2003 | Snapp et al. |
| 2002/0016724 A1 | 2/2002 | Yang et al. | 2003/0073432 A1 | 4/2003 | Meade, II |
| 2002/0019225 A1 | 2/2002 | Miyashita | 2003/0083055 A1 | 5/2003 | Riordan et al. |
| 2002/0026348 A1 | 2/2002 | Fowler et al. | 2003/0083873 A1 | 5/2003 | Ross et al. |
| 2002/0028690 A1 | 3/2002 | McKenna et al. | 2003/0084121 A1 | 5/2003 | De Boor et al. |
| 2002/0031120 A1 | 3/2002 | Rakib | 2003/0093503 A1 | 5/2003 | Yamaki et al. |
| 2002/0034292 A1 | 3/2002 | Tuoriniemi et al. | 2003/0093790 A1 | 5/2003 | Logan et al. |
| 2002/0036642 A1 | 3/2002 | Kwon et al. | 2003/0099367 A1 | 5/2003 | Okamura |
| 2002/0038219 A1 | 3/2002 | Buchshriber et al. | 2003/0100326 A1 | 5/2003 | Grube et al. |
| 2002/0039914 A1 | 4/2002 | Hama et al. | 2003/0107580 A1 | 6/2003 | Egawa et al. |
| 2002/0047787 A1 | 4/2002 | Mikkola et al. | 2003/0109251 A1 | 6/2003 | Fujito et al. |
| 2002/0049742 A1 | 4/2002 | Chan et al. | 2003/0114191 A1 | 6/2003 | Nishimura |
| 2002/0054068 A1 | 5/2002 | Ellis et al. | 2003/0115240 A1 | 6/2003 | Cho |
| 2002/0055350 A1 | 5/2002 | Gupte et al. | 2003/0117316 A1 | 6/2003 | Tischer |
| 2002/0058497 A1 | 5/2002 | Jeong | 2003/0119479 A1 | 6/2003 | Arima et al. |
| 2002/0058531 A1 | 5/2002 | Terasaki et al. | 2003/0119485 A1 | 6/2003 | Ogasawara |
| 2002/0065037 A1 | 5/2002 | Messina et al. | 2003/0119562 A1 | 6/2003 | Kokubo |
| 2002/0065604 A1 | 5/2002 | Sekiyama | 2003/0122779 A1 | 7/2003 | Martin et al. |
| 2002/0066115 A1 | 5/2002 | Wendelrup | 2003/0132928 A1 | 7/2003 | Kori |
| 2002/0068558 A1 | 6/2002 | Janik | 2003/0135563 A1 | 7/2003 | Bodin et al. |
| 2002/0068585 A1 | 6/2002 | Chan et al. | 2003/0142957 A1 | 7/2003 | Young et al. |
| 2002/0068599 A1 | 6/2002 | Rodriguez et al. | 2003/0148772 A1 | 8/2003 | Ben-Ari |
| 2002/0082059 A1 | 6/2002 | Nariai et al. | 2003/0153364 A1 | 8/2003 | Osann, Jr. |
| 2002/0085700 A1 | 7/2002 | Metcalf | 2003/0155413 A1 | 8/2003 | Kovesdi et al. |
| 2002/0094806 A1 | 7/2002 | Kamimura | 2003/0157929 A1 | 8/2003 | Janssen et al. |
| 2002/0097984 A1 | 7/2002 | Abecassis | 2003/0166399 A1 | 9/2003 | Tokkonen et al. |
| 2002/0098857 A1 | 7/2002 | Ishii | 2003/0171113 A1 | 9/2003 | Choi |
| 2002/0102960 A1 | 8/2002 | Lechner | 2003/0174685 A1 | 9/2003 | Hasebe |
| 2002/0103872 A1 | 8/2002 | Watanabe | 2003/0181201 A1 | 9/2003 | Bomze et al. |
| 2002/0110246 A1 | 8/2002 | Gosior et al. | 2003/0204562 A1 | 10/2003 | Hwang |
| 2002/0115469 A1 | 8/2002 | Rekimoto et al. | 2003/0220835 A1 | 11/2003 | Barnes, Jr. |
| 2002/0120589 A1 | 8/2002 | Aoki | 2003/0222762 A1 | 12/2003 | Beigl et al. |
| 2002/0120718 A1 | 8/2002 | Lee | 2003/0224760 A1 | 12/2003 | Day |
| 2002/0123336 A1 | 9/2002 | Kamada | 2003/0227570 A1 | 12/2003 | Kim et al. |
| 2002/0127997 A1 | 9/2002 | Karlstedt et al. | 2003/0229900 A1 | 12/2003 | Reisman |
| 2002/0133342 A1 | 9/2002 | McKenna | 2003/0236866 A1 | 12/2003 | Light |
| 2002/0137470 A1 | 9/2002 | Baron et al. | 2004/0003307 A1 | 1/2004 | Tsuji |
| 2002/0137526 A1 | 9/2002 | Shinohara | 2004/0029640 A1 | 2/2004 | Masuyama et al. |
| 2002/0142763 A1 | 10/2002 | Kolsky | 2004/0033795 A1 | 2/2004 | Walsh et al. |
| 2002/0147645 A1 | 10/2002 | Alao et al. | 2004/0034692 A1 | 2/2004 | Eguchi et al. |
| 2002/0151326 A1 | 10/2002 | Awada et al. | 2004/0082321 A1 | 4/2004 | Kontianinen |
| 2002/0151327 A1 | 10/2002 | Levitt | 2004/0103303 A1 | 5/2004 | Yamauchi et al. |
| 2002/0154632 A1 | 10/2002 | Wang et al. | 2004/0107072 A1 | 6/2004 | Dietrich et al. |
| 2002/0157101 A1 | 10/2002 | Schrader et al. | 2004/0114732 A1 | 6/2004 | Choe et al. |
| 2002/0164996 A1 | 11/2002 | Dorenbosch | 2004/0117108 A1 | 6/2004 | Nemeth |
| 2002/0165850 A1 | 11/2002 | Roberts et al. | 2004/0132445 A1 | 7/2004 | Rogalski et al. |
| 2002/0168959 A1 | 11/2002 | Noguchi et al. | 2004/0137893 A1 | 7/2004 | Muthuswamy et al. |
| 2002/0173344 A1 | 11/2002 | Cupps et al. | 2004/0137983 A1 | 7/2004 | Kerr et al. |
| 2002/0177407 A1 | 11/2002 | Mitsumoto | 2004/0142678 A1 | 7/2004 | Krasner |
| 2002/0178009 A1 | 11/2002 | Firman | 2004/0157664 A1 | 8/2004 | Link |
| 2002/0178225 A1 | 11/2002 | Madenberg et al. | 2004/0166832 A1 | 8/2004 | Portman et al. |
| 2002/0183045 A1 | 12/2002 | Emmerson et al. | 2004/0166879 A1 | 8/2004 | Meadows et al. |
| 2002/0191951 A1 | 12/2002 | Sodeyama et al. | 2004/0174863 A1 | 9/2004 | Caspi et al. |
| 2002/0196378 A1 | 12/2002 | Slobodin et al. | 2004/0183937 A1 | 9/2004 | Viinikanoja et al. |
| 2002/0198813 A1 | 12/2002 | Patterson, Jr. et al. | 2004/0203490 A1 | 10/2004 | Kaplan |
| 2002/0198936 A1 | 12/2002 | McIntyre et al. | 2004/0203520 A1 | 10/2004 | Schirtzinger et al. |
| 2003/0003967 A1 | 1/2003 | Ito | 2004/0203577 A1 | 10/2004 | Forman et al. |
| 2003/0007556 A1 | 1/2003 | Oura et al. | 2004/0203904 A1 | 10/2004 | Gwon et al. |
| 2003/0013483 A1 | 1/2003 | Ausems et al. | 2004/0203909 A1 | 10/2004 | Koster |
| 2003/0014286 A1 | 1/2003 | Cappellini | 2004/0204035 A1 | 10/2004 | Raghuram et al. |
| 2003/0017857 A1 | 1/2003 | Kitson et al. | 2004/0204126 A1 | 10/2004 | Reyes et al. |
| 2003/0018744 A1 | 1/2003 | Johanson et al. | 2004/0204821 A1 | 10/2004 | Tu |
| 2003/0018748 A1 | 1/2003 | McKenna, Jr. | 2004/0204848 A1 | 10/2004 | Matsuo et al. |
| 2003/0032389 A1 | 2/2003 | Kim et al. | 2004/0209649 A1 | 10/2004 | Lord |
| 2003/0032406 A1 | 2/2003 | Minear et al. | 2004/0216037 A1 | 10/2004 | Hishida et al. |
| 2003/0033214 A1 | 2/2003 | Mikkelsen et al. | 2004/0218738 A1 | 11/2004 | Arai et al. |
| 2003/0038800 A1 | 2/2003 | Kawahara | 2004/0219951 A1 | 11/2004 | Holder |
| 2003/0045301 A1 | 3/2003 | Wollrab | 2004/0222988 A1 | 11/2004 | Donnelly |
| 2003/0045311 A1 | 3/2003 | Larikka et al. | 2004/0235513 A1 | 11/2004 | O'Connell |
| 2003/0045329 A1 | 3/2003 | Kinoshita | 2004/0235520 A1 | 11/2004 | Cadiz et al. |
| 2003/0045996 A1 | 3/2003 | Yamazaki et al. | 2004/0242269 A1 | 12/2004 | Fadell |
| 2003/0050776 A1 | 3/2003 | Blair | 2004/0248586 A1 | 12/2004 | Patel et al. |
| 2003/0052964 A1 | 3/2003 | Priestman et al. | 2004/0252197 A1 | 12/2004 | Fraley et al. |
| 2003/0054830 A1 | 3/2003 | Williams et al. | 2004/0257208 A1 | 12/2004 | Huang et al. |
| 2003/0055994 A1 | 3/2003 | Herrmann et al. | 2004/0267628 A1 | 12/2004 | Stillman |

| | | | | | | |
|---|---|---|---|---|---|---|
| 2005/0004749 A1 | 1/2005 | Park | | 2006/0166650 A1 | 7/2006 | Berger et al. |
| 2005/0020301 A1 | 1/2005 | Lee | | 2006/0199571 A1 | 9/2006 | Chin et al. |
| 2005/0026629 A1 | 2/2005 | Contractor | | 2006/0206913 A1 | 9/2006 | Jerding et al. |
| 2005/0036509 A1 | 2/2005 | Acharya et al. | | 2006/0234758 A1 | 10/2006 | Parupudi et al. |
| 2005/0048987 A1 | 3/2005 | Glass | | 2006/0284732 A1 | 12/2006 | Brock-Fisher |
| 2005/0070257 A1 | 3/2005 | Saarinen et al. | | 2007/0061845 A1 | 3/2007 | Barnes, Jr. |
| 2005/0090768 A1 | 4/2005 | Brattesani et al. | | 2007/0109262 A1 | 5/2007 | Oshima et al. |
| 2005/0097038 A1 | 5/2005 | Yu et al. | | 2007/0121596 A1 | 5/2007 | Kurapati et al. |
| 2005/0107119 A1 | 5/2005 | Lee et al. | | 2007/0135145 A1 | 6/2007 | Lee et al. |
| 2005/0113080 A1 | 5/2005 | Nishimura | | 2007/0142047 A1 | 6/2007 | Heeschen |
| 2005/0120225 A1 | 6/2005 | Kirsch et al. | | 2007/0190944 A1 | 8/2007 | Doan et al. |
| 2005/0136949 A1 | 6/2005 | Barnes, Jr. | | 2007/0204014 A1 | 8/2007 | Greer et al. |
| 2005/0153681 A1 | 7/2005 | Hanson | | 2007/0218891 A1 | 9/2007 | Cox |
| 2005/0153745 A1 | 7/2005 | Smethers | | 2007/0260456 A1 | 11/2007 | Proux et al. |
| 2005/0164684 A1 | 7/2005 | Chen et al. | | 2007/0262848 A1 | 11/2007 | Berstis et al. |
| 2005/0165871 A1 | 7/2005 | Barrs, II et al. | | 2008/0014917 A1 | 1/2008 | Rhoads et al. |
| 2005/0166242 A1 | 7/2005 | Matsumoto et al. | | 2008/0016526 A1 | 1/2008 | Asmussen |
| 2005/0186954 A1 | 8/2005 | Kenney | | 2008/0016534 A1 | 1/2008 | Ortiz et al. |
| 2005/0191969 A1 | 9/2005 | Mousseau | | 2008/0058005 A1 | 3/2008 | Zicker et al. |
| 2005/0235312 A1 | 10/2005 | Karaoguz et al. | | 2008/0194273 A1 | 8/2008 | Kansal et al. |
| 2005/0257149 A1 | 11/2005 | Kamiya et al. | | 2008/0242283 A1 | 10/2008 | Ruckart |
| 2005/0261945 A1 | 11/2005 | Mougin et al. | | 2008/0250459 A1 | 10/2008 | Roman |
| 2006/0015819 A1 | 1/2006 | Hawkins et al. | | 2009/0153490 A1 | 6/2009 | Nymark et al. |
| 2006/0031407 A1 | 2/2006 | Dispensa et al. | | 2009/0197641 A1 | 8/2009 | Rofougaran et al. |
| 2006/0041923 A1 | 2/2006 | McQuaide, Jr. | | 2010/0030557 A1 | 2/2010 | Molloy et al. |
| 2006/0052100 A1 | 3/2006 | Almgren | | 2010/0099457 A1 | 4/2010 | Kim |
| 2006/0073820 A1 | 4/2006 | Craswell et al. | | | | |
| 2006/0133590 A1 | 6/2006 | Jiang | | FOREIGN PATENT DOCUMENTS | | |
| 2006/0140387 A1 | 6/2006 | Boldt | | JP 2005/216149 A1 | 8/2005 | |
| 2006/0143655 A1 | 6/2006 | Ellis et al. | | WO WO03001457 A1 | 1/2003 | |

COMMUNICATION DEVICE

CROSS REFERENCE TO RELATED APPLICATIONS

The application is a continuation of U.S. Ser. No. 11/623,061, filed 2007-01-13, which is a continuation of U.S. Ser. No. 10/905,365, filed 2004-12-30, which claims the benefit of U.S. Provisional Application No. 60/521,265, filed 2004-03-23, all of which are hereby incorporated herein by reference in their entirety.

BACKGROUND OF INVENTION

The invention relates to a communication device and more particularly to the communication device which has a capability to communicate with another communication device in a wireless fashion.

U.S. Pat. No. 4,937,570 is introduced as a prior art of the present invention of which the summary is the following: "A route guidance display device for an automotive vehicle capable of displaying route patterns with a three-dimensional effect to enhance the viewer's comprehension of the road route situation being encountered. The display device includes a plurality of intersecting display segments indicative of corresponding possible route configurations. A depth-enhancing segment is included in a portion indicating the straight-ahead route. An intersection name display section may be separately included to display the name and related information regarding an intersection laying ahead." However, the foregoing prior art does not disclose the communication device which implements a voice communicating function, an attached file emailing function, a geographic location function, a dictionary function, a schedule notifying function, a multiple type TV program function, a multiple TV screen displaying function, a touch panel function, a communication device finding function, and a voice message displaying function, independently or simultaneously.

For the avoidance of doubt, the number of the prior arts introduced herein (and/or in IDS) may be of a large one, however, the applicant has no intent to hide the more relevant prior art(s) in the less relevant ones.

SUMMARY OF INVENTION

It is an object of the present invention to provide a device capable of implementing a plurality of functions.

It is another object of the present invention to provide merchandise to merchants attractive to the consumers in the U.S.

It is another object of the present invention to provide mobility to the users of the device in which the present invention is incorporated.

It is another object of the present invention to provide more convenience to the users of the device compared to the prior art.

It is another object of the present invention to overcome the shortcomings associated with the prior art.

It is another object of the present invention to provide a convenient device capable to implement the functions of both voice communication and audio(visual) player to consumers.

The present invention introduces the communication device which implements a voice communicating function, an attached file emailing function, a geographic location function, a dictionary function, a schedule notifying function, a multiple type TV program function, a multiple TV screen displaying function, a touch panel function, a communication device finding function, and a voice message displaying function, independently or simultaneously.

BRIEF DESCRIPTION OF DRAWING

The above and other aspects, features, and advantages of the invention will be better understood by reading the following more particular description of the invention, presented in conjunction with the following drawing, wherein.

DETAILED DESCRIPTION

Figure 1:
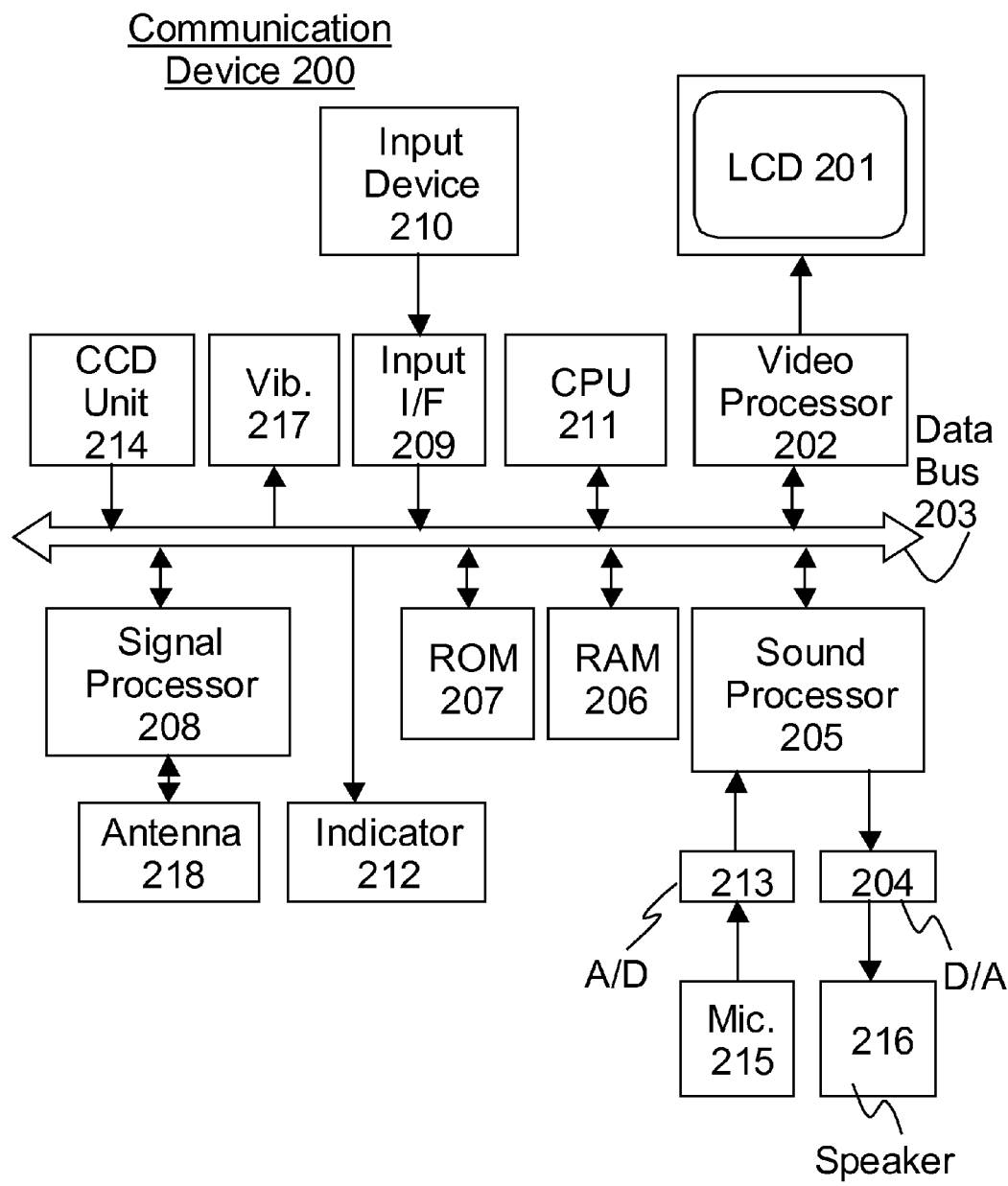
FIG. 1 is a block diagram illustrating an exemplary embodiment of the present invention.

The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the paragraph number is cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

This paragraph illustrates the data stored in Host H. In this embodiment, Host H includes Host Information Storage Area H00*a* which stores various types of data to assist and/or co-operate with Communication Device 200 to implement all modes, functions, and systems described in this specification. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

<<Attached File Emailing Function>>

The following paragraphs illustrate the attached file emailing function which enables Communication Device 200 to send an email with a file attached selected by the user of Communication Device 200.

This paragraph illustrates the storage area included in RAM 206 (FIG. 1) of Communication Device 200. In this embodiment, RAM 206 includes Attached File Emailing Information Storage Area 20678*a* of which the data and the software programs stored therein are described hereinafter.

The data and/or the software programs stored in Attached File Emailing Information Storage Area 20678*a* may be downloaded from Host H.

This paragraph illustrates the storage areas included in Attached File Emailing Information Storage Area 20678*a*. In this embodiment, Attached File Emailing Information Storage Area 20678*a* includes Attached File Emailing Data Storage Area 20678*b* and Attached File Emailing Software Storage Area 20678*c*. Attached File Emailing Data Storage Area 20678*b* stores the data necessary to implement the present function. Attached File Emailing Software Storage Area 20678*c* stores the software programs necessary to implement the present function.

This paragraph illustrates the storage areas included in Attached File Emailing Data Storage Area 20678*b*. In this embodiment, Attached File Emailing Data Storage Area 20678*b* includes Selected File Storage Area 20678*b*1, Email Data Storage Area 20678*b*2, and Work Area 20678*b*3. Selected File Storage Area 20678*b*1 stores the selected file which is the file selected in S4 explained hereinafter. Email Data Storage Area 20678*b*2 stores the email data which includes alphanumeric data input via Input Device 210 (FIG. 1). Work Area 20678*b*3 is utilized as a work area to perform calculation and temporarily store data.

This paragraph illustrates the software programs stored in Attached File Emailing Software Storage Area 20678*c*. In this embodiment, Attached File Emailing Software Storage Area 20678*c* stores Email Data Producing Software 20678*c*1, File Selecting Software 20678*c*2, and Selected File Emailing Software 20678*c*3. Email Data Producing Software 20678*c*1 is the software program described hereinafter. File Selecting Software 20678*c*2 is the software program described hereinafter. Selected File Emailing Software 20678*c*3 is the software program described hereinafter.

This paragraph illustrates Email Data Producing Software 20678*c*1 of Communication Device 200 which produces email. In this embodiment, the user of Communication Device 200 opens a new email data by utilizing Input Device 210 (FIG. 1) or via voice recognition system (S1), and inputs a plurality of alphanumeric data (S2). Here, the email data is the data which primarily includes a plurality of alphanumeric data and which is sent via email. CPU 211 (FIG. 1) of Communication Device 200 stores the email data in Email Data Storage Area 20678*b*2 (S3).

This paragraph illustrates File Selecting Software 20678*c*2 of Communication Device 200, which selects the file to be attached to the email produced in the previous paragraph. In this embodiment, CPU 211 (FIG. 1) of Communication Device 200 retrieves the email data from Email Data Storage Area 20678*b*2 and displays the data on LCD 201 (FIG. 1) (S1). The user of Communication Device 200 inputs a file list displaying signal (S2). Here, the file list displaying signal is a signal to display a list of files attachable to the email data. CPU 211 displays a file list (S3). The file list displaying signal is a signal to display a list of files attachable to the email data. The user of Communication Device 200 selects a file from the file list (S4). CPU 211 stores the selected file in Selected File Storage Area 20678*b*1 (S5), and sets a link between the email data and the selected file stored in Selected File Storage Area 20678*b*1 (S6). The file list is closed thereafter (S7).

This paragraph illustrates Selected File Emailing Software 20678*c*3 of Communication Device 200, which sends the email produced hereinbefore with the file selected hereinbefore. In this embodiment, CPU 211 (FIG. 1) of Communication Device 200 retrieves the email data from Email Data Storage Area 20678*b*2 (S1), and also retrieves the file selected in S4 explained in the previous paragraph from Selected File Storage Area 20678*b*1 (S2). CPU 211 then sends the email data with the selected file (S3).

<<Geographic Location Recording Function>>

The following paragraphs illustrate the geographic location recording function which records the geographic location of Device A, a Communication Device 200, and/or Device B, another Communication Device 200. Assume that user A owns Device A, a Communication Device 200, and user B owns Device B, another Communication Device 200.

This paragraph illustrates the storage area included in RAM 206 (FIG. 1) of Device A. In this embodiment, RAM 206 includes Geographic Location Recording Information Storage Area 20686*a*A of which the data and the software programs stored therein are described hereinafter.

The data and/or the software programs stored in Geographic Location Recording Information Storage Area 20686aA may be downloaded from Host H.

This paragraph illustrates the storage areas included in Geographic Location Recording Information Storage Area 20686aA. In this embodiment, Geographic Location Recording Information Storage Area 20686aA includes Geographic Location Recording Data Storage Area 20686bA and Geographic Location Recording Software Storage Area 20686cA. Geographic Location Recording Data Storage Area 20686bA stores the data necessary to implement the present function on the side of Device A, such as the ones described hereinafter. Geographic Location Recording Software Storage Area 20686cA stores the software programs necessary to implement the present function on the side of Device A, such as the ones described hereinafter.

This paragraph illustrates the storage areas included in Geographic Location Recording Data Storage Area 20686bA. In this embodiment, Geographic Location Recording Data Storage Area 20686bA includes Device A's Location Data Storage Area 20686b1A, Device B's Location Data Storage Area 20686b2A, 3D Map Data Storage Area 20686b3A, Street Address Location Storage Area 20686b4A, Phone Number Location Storage Area 20686b5A, Icon Image Data Storage Area 20686b6A, and Work Area 20686b7A. Device A's Location Data Storage Area 20686b1A stores the data described hereinafter. Device B's Location Data Storage Area 20686b2A stores the data described hereinafter. 3D Map Data Storage Area 20686b3A stores the 3D map data. Here, the 3D map data is a map data covering the entire nation composed of a plurality of three-dimensional data. Street Address Location Storage Area 20686b4A stores the data described hereinafter. Phone Number Location Storage Area 20686b5A stores the data described hereinafter. Icon Image Data Storage Area 20686b6A stores the data described hereinafter. Work Area 20686b7A is utilized as a work area to perform calculation and temporarily store data.

This paragraph illustrates the data stored in Device A's Location Data Storage Area 20686b1A. In this embodiment, Device A's Location Data Storage Area 20686b1A comprises two columns, i.e., 'Time Data' and 'Device A's Location Data'. Column 'Time Data' stores the time data, and each time data is an identification of the Device A's location data stored in column 'Device A's Location Data'. Each time data represents the time at which the corresponding Device A's location data is stored in Device A's Location Data Storage Area 20686b1A. The time data is stored in (yyyy/mm/dd/hh/mm/ss) format, wherein 'yyyy' represents the year, 'mm' represents the month 'dd' represents the day, 'hh' represents the hour, 'mm' represents the minute, and 'ss' represents the second. Column 'Device A's Location Data' stores the Device A's location data, and each Device A's location data represents the geographic location in (x,y,z) format of Device A at the time indicated by the corresponding time data. In this embodiment, Device A's Location Data Storage Area 20686b1A stores the following data: the time data 'Time Data#1' and the corresponding Device A's location data 'Device A's Location Data#1'; the time data 'Time Data#2' and the corresponding Device A's location data 'Device A's Location Data#2'; the time data 'Time Data#3' and the corresponding Device A's location data 'Device A's Location Data#3'; and the time data 'Time Data#4' and the corresponding Device A's location data 'Device A's Location Data#4'.

This paragraph illustrates the data stored in Device B's Location Data Storage Area 20686b2A. In this embodiment, Device B's Location Data Storage Area 20686b2A comprises two columns, i.e., 'Time Data' and 'Device B's Location Data'. Column 'Time Data' stores the time data, and each time data is an identification of the Device B's location data stored in column 'Device B's Location Data'. Each time data represents the time at which the corresponding Device B's location data is stored in Device B's Location Data Storage Area 20686b2A. The time data is stored in (yyyy/mm/dd/hh/mm/ss) format, wherein 'yyyy' represents the year, 'mm' represents the month 'dd' represents the day, 'hh' represents the hour, 'mm' represents the minute, and 'ss' represents the second. Column 'Device B's Location Data' stores the Device B's location data, and each Device B's location data represents the geographic location in (x,y,z) format of Device B at the time indicated by the corresponding time data. In this embodiment, Device B's Location Data Storage Area 20686b2A stores the following data: the time data 'Time Data#5' and the corresponding Device B's location data 'Device B's Location Data#5'; the time data 'Time Data#6' and the corresponding Device B's location data 'Device B's Location Data#6'; the time data 'Time Data#7' and the corresponding Device B's location data 'Device B's Location Data#7'; and the time data 'Time Data#8' and the corresponding Device B's location data 'Device B's Location Data#8'.

This paragraph illustrates the data stored in Street Address Location Storage Area 20686b4A. In this embodiment, Street Address Location Storage Area 20686b4A comprises two columns, i.e., 'Street Address Data' and 'Street Address Location Data'. Column 'Street Address Data' stores the street address data, and each street address data represents a street address. The street address data includes the name of the state, the name of county, the name of street, and/or the street number. Column 'Street Address Location Data' stores the street address location data, and each street address location data represents the geographic location in (x,y,z) format of the corresponding street address data. In this embodiment, Street Address Location Storage Area 20686b4A stores the following data: the street address data 'Street Address Data#1' and the corresponding street address location data 'Street Address Location Data#1'; the street address data 'Street Address Data#2' and the corresponding street address location data 'Street Address Location Data#2'; the street address data 'Street Address Data#3' and the corresponding street address location data 'Street Address Location Data#3'; and the street address data 'Street Address Data#4' and the corresponding street address location data 'Street Address Location Data#4'.

This paragraph illustrates the data stored in Phone Number Location Storage Area 20686b5A. In this embodiment, Phone Number Location Storage Area 20686b5A comprises two columns, i.e., 'Phone Number Data' and 'Phone Number Location Data'. Column 'Phone Number Data' stores the phone number data, and each phone number data represents a phone number. Column 'Phone Number Location Data' stores the phone number location data, and each phone number location data represents the geographic location of the premises (e.g., a restaurant or a hotel) in (x,y,z) format at which the corresponding phone number data is utilized. In this embodiment, Phone Number Location Storage Area 20686b5A stores the following data: the phone number data 'Phone Number Data#1' and the corresponding phone number location data 'Phone Number Location Data#1'; the phone number data 'Phone Number Data#2' and the corresponding phone number location data 'Phone Number Location Data#2'; the phone number data 'Phone Number Data#3' and the corresponding phone number location data 'Phone Number Location Data#3'; and the phone number data 'Phone Number Data#4' and the corresponding phone number location data 'Phone Number Location Data#4'.

This paragraph illustrates the data stored in Icon Image Data Storage Area 20686*b*6A. In this embodiment, Icon Image Data Storage Area 20686*b*6A comprises two columns, i.e., 'Icon Image ID' and 'Icon Image Data'. Column 'Icon Image ID' stores the icon image IDs, and each icon image ID is an identification of the corresponding icon image data stored in column 'Icon Image Data'. Column 'Icon Image Data' stores the icon image data, and each icon image data is an image data designed to be displayed on LCD 201 (FIG. 1) indicating the geographic location of Device A or Device B. In this embodiment, Icon Image Data Storage Area 20686*b*6A stores the following data: the icon image ID 'Icon Image#1' and the corresponding icon image data 'Icon Image Data#1'; and the icon image ID 'Icon Image#2' and the corresponding icon image data 'Icon Image Data#2'. In the present example, the icon image data 'Icon Image Data#1' represents Device A and the icon image data 'Icon Image Data#2' represents Device B.

This paragraph illustrates the software programs stored in Geographic Location Recording Software Storage Area 20686*c*A. In this embodiment, Geographic Location Recording Software Storage Area 20686*c*A stores Device A's Location One Time Recording Software 20686*c*1A, Device A's Location Continuous Recording Software 20686*c*2A, Device A's Location Displaying Software 20686*c*3A, Device A's Location Replaying Software 20686*c*4A, Device A's Location Street Address Displaying Software 20686*c*5A, Device A's Location Phone Number Displaying Software 20686*c*6A, Device A's Location Information Sending/Receiving Software 20686*c*7A, Device B's Location One Time Recording Software 20686*c*8A, Device B's Location Continuous Recording Software 20686*c*9A, Device B's Location Displaying Software 20686*c*10A, Device B's Location Replaying Software 20686*c*11A, Device B's Location Street Address Displaying Software 20686*c*12A, Device B's Location Phone Number Displaying Software 20686*c*13A, and Device B's Location Information Sending/Receiving Software 20686*c*14A. Device A's Location One Time Recording Software 20686*c*1A is the software program described hereinafter. Device A's Location Continuous Recording Software 20686*c*2A is the software program described hereinafter. Device A's Location Displaying Software 20686*c*3A is the software program described hereinafter. Device A's Location Replaying Software 20686*c*4A is the software program described hereinafter. Device A's Location Street Address Displaying Software 20686*c*5A is the software program described hereinafter. Device A's Location Phone Number Displaying Software 20686*c*6A is the software program described hereinafter. Device A's Location Information Sending/Receiving Software 20686*c*7A is the software program described hereinafter. Device B's Location One Time Recording Software 20686*c*8A is the software program described hereinafter. Device B's Location Continuous Recording Software 20686*c*9A is the software program described hereinafter. Device B's Location Displaying Software 20686*c*10A is the software program described hereinafter. Device B's Location Replaying Software 20686*c*11A is the software program described hereinafter. Device B's Location Street Address Displaying Software 20686*c*12A is the software program described hereinafter. Device B's Location Phone Number Displaying Software 20686*c*13A is the software program described hereinafter. Device B's Location Information Sending/Receiving Software 20686*c*14A is the software program described hereinafter.

This paragraph illustrates the storage area included in RAM 206 (FIG. 1) of Device B. In this embodiment, RAM 206 includes Geographic Location Recording Information Storage Area 20686*a*B of which the data and the software programs stored therein are described hereinafter.

The data and/or the software programs stored in Geographic Location Recording Information Storage Area 20686*a*B may be downloaded from Host H.

This paragraph illustrates the storage areas included in Geographic Location Recording Information Storage Area 20686*a*B. In this embodiment, Geographic Location Recording Information Storage Area 20686*a*B includes Geographic Location Recording Data Storage Area 20686*b*B and Geographic Location Recording Software Storage Area 20686*c*B. Geographic Location Recording Data Storage Area 20686*b*B stores the data necessary to implement the present function on the side of Device B, such as the ones described hereinafter. Geographic Location Recording Software Storage Area 20686*c*B stores the software programs necessary to implement the present function on the side of Device B, such as the ones described hereinafter.

This paragraph illustrates the storage areas included in Geographic Location Recording Data Storage Area 20686*b*B. In this embodiment, Geographic Location Recording Data Storage Area 20686*b*B includes Device B's Location Data Storage Area 20686*b*1B, Device A's Location Data Storage Area 20686*b*2B, 3D Map Data Storage Area 20686*b*3B, Street Address Location Storage Area 20686*b*4B, Phone Number Location Storage Area 20686*b*5B, Icon Image Data Storage Area 20686*b*6B, and Work Area 20686*b*7B. Device B's Location Data Storage Area 20686*b*1B stores the data described hereinafter. Device A's Location Data Storage Area 20686*b*2B stores the data described hereinafter. 3D Map Data Storage Area 20686*b*3B stores the 3D map data. Here, the 3D map data is a map data covering the entire nation composed of a plurality of three-dimensional data. Street Address Location Storage Area 20686*b*4B stores the data described hereinafter. Phone Number Location Storage Area 20686*b*5B stores the data described hereinafter. Icon Image Data Storage Area 20686*b*6B stores the data described hereinafter. Work Area 20686*b*7B is utilized as a work area to perform calculation and temporarily store data.

This paragraph illustrates the data stored in Device B's Location Data Storage Area 20686*b*1B. In this embodiment, Device B's Location Data Storage Area 20686*b*1B comprises two columns, i.e., 'Time Data' and 'Device B's Location Data'. Column 'Time Data' stores the time data, and each time data is an identification of the Device B's location data stored in column 'Device B's Location Data'. Each time data represents the time at which the corresponding Device B's location data is stored in Device B's Location Data Storage Area 20686*b*1B. The time data is stored in (yyyy/mm/dd/hh/mm/ss) format, wherein 'yyyy' represents the year, 'mm' represents the month 'dd' represents the day, 'hh' represents the hour, 'mm' represents the minute, and 'ss' represents the second. Column 'Device B's Location Data' stores the Device B's location data, and each Device B's location data represents the geographic location in (x,y,z) format of Device B at the time indicated by the corresponding time data. In this embodiment, Device B's Location Data Storage Area 20686*b*1B stores the following data: the time data 'Time Data#5' and the corresponding Device B's location data 'Device B's Location Data#5'; the time data 'Time Data#6' and the corresponding Device B's location data 'Device B's Location Data#6'; the time data 'Time Data#7' and the corresponding Device B's location data 'Device B's Location Data#7'; and the time data 'Time Data#8' and the corresponding Device B's location data 'Device B's Location Data#8'.

This paragraph illustrates the data stored in Device A's Location Data Storage Area 20686b2B. In this embodiment, Device A's Location Data Storage Area 20686b2B comprises two columns, i.e., 'Time Data' and 'Device A's Location Data'. Column 'Time Data' stores the time data, and each time data is an identification of the Device A's location data stored in column 'Device A's Location Data'. Each time data represents the time at which the corresponding Device A's location data is stored in Device A's Location Data Storage Area 20686b2B. The time data is stored in (yyyy/mm/dd/hh/mm/ss) format, wherein 'yyyy' represents the year, 'mm' represents the month 'dd' represents the day, 'hh' represents the hour, 'mm' represents the minute, and 'ss' represents the second. Column 'Device A's Location Data' stores the Device A's location data, and each Device A's location data represents the geographic location in (x,y,z) format of Device A at the time indicated by the corresponding time data. In this embodiment, Device A's Location Data Storage Area 20686b2B stores the following data: the time data 'Time Data#1' and the corresponding Device A's location data 'Device A's Location Data#1'; the time data 'Time Data#2' and the corresponding Device A's location data 'Device A's Location Data#2'; the time data 'Time Data#3' and the corresponding Device A's location data 'Device A's Location Data#3'; and the time data 'Time Data#4' and the corresponding Device A's location data 'Device A's Location Data#4'.

This paragraph illustrates the data stored in Street Address Location Storage Area 20686b4B. In this embodiment, Street Address Location Storage Area 20686b4B comprises two columns, i.e., 'Street Address Data' and 'Street Address Location Data'. Column 'Street Address Data' stores the street address data, and each street address data represents a street address. The street address data includes the name of state, the name of county, the name of street, and/or the street number. Column 'Street Address Location Data' stores the street address location data, and each street address location data represents the geographic location in (x,y,z) format of the corresponding street address data. In this embodiment, Street Address Location Storage Area 20686b4B stores the following data: the street address data 'Street Address Data#1' and the corresponding street address location data 'Street Address Location Data#1'; the street address data 'Street Address Data#2' and the corresponding street address location data 'Street Address Location Data#2'; the street address data 'Street Address Data#3' and the corresponding street address location data 'Street Address Location Data#3'; and the street address data 'Street Address Data#4' and the corresponding street address location data 'Street Address Location Data#4'.

This paragraph illustrates the data stored in Phone Number Location Storage Area 20686b5B. In this embodiment, Phone Number Location Storage Area 20686b5B comprises two columns, i.e., 'Phone Number Data' and 'Phone Number Location Data'. Column 'Phone Number Data' stores the phone number data, and each phone number data represents a phone number. Column 'Phone Number Location Data' stores the phone number location data, and each phone number location data represents the geographic location of the premises (e.g., a restaurant or a hotel) in (x,y,z) format at which the corresponding phone number data is utilized. In this embodiment, Phone Number Location Storage Area 20686b5B stores the following data: the phone number data 'Phone Number Data#1' and the corresponding phone number location data 'Phone Number Location Data#1'; the phone number data 'Phone Number Data#2' and the corresponding phone number location data 'Phone Number Location Data#2'; the phone number data 'Phone Number Data#3' and the corresponding phone number location data 'Phone Number Location Data#3'; and the phone number data 'Phone Number Data#4' and the corresponding phone number location data 'Phone Number Location Data#4'.

This paragraph illustrates the data stored in Icon Image Data Storage Area 20686b6B. In this embodiment, Icon Image Data Storage Area 20686b6B comprises two columns, i.e., 'Icon Image ID' and 'Icon Image Data'. Column 'Icon Image ID' stores the icon image IDs, and each icon image ID is an identification of the corresponding icon image data stored in column 'Icon Image Data'. Column 'Icon Image Data' stores the icon image data, and each icon image data is an image data designed to be displayed on LCD 201 (FIG. 1) indicating the geographic location of Device A or Device B. In this embodiment, Icon Image Data Storage Area 20686b6B stores the following data: the icon image ID 'Icon Image#1' and the corresponding icon image data 'Icon Image Data#1'; the icon image ID 'Icon Image#2' and the corresponding icon image data 'Icon Image Data#2'; and In the present example, the icon image data 'Icon Image Data#1' represents Device A and the icon image data 'Icon Image Data#2' represents Device B.

This paragraph illustrates the software programs stored in Geographic Location Recording Software Storage Area 20686cB. In this embodiment, Geographic Location Recording Software Storage Area 20686cB stores Device B's Location One Time Recording Software 20686c1B, Device B's Location Continuous Recording Software 20686c2B, Device B's Location Displaying Software 20686c3B, Device B's Location Replaying Software 20686c4B, Device B's Location Street Address Displaying Software 20686c5B, Device B's Location Phone Number Displaying Software 20686c6B, Device B's Location Information Sending Software 20686c7B, Device A's Location One Time Recording Software 20686c8B, Device A's Location Continuous Recording Software 20686c9B, Device A's Location Displaying Software 20686c10B, Device A's Location Replaying Software 20686c11B, Device A's Location Street Address Displaying Software 20686c12B, Device A's Location Phone Number Displaying Software 20686c13B, and Device A's Location Information Sending/Receiving Software 20686c14B. Device B's Location One Time Recording Software 20686c1B is the software program described hereinafter. Device B's Location Continuous Recording Software 20686c2B is the software program described hereinafter. The sequence of Device B's Location Displaying Software 20686c3B is similar to the sequence of Device A's Location Displaying Software 20686c3A. The sequence of Device B's Location Replaying Software 20686c4B is similar to the sequence of Device A's Location Replaying Software 20686c4A. The sequence of Device B's Location Street Address Displaying Software 20686c5B is similar to the sequence of Device A's Location Street Address Displaying Software 20686c5A. The sequence of Device B's Location Phone Number Displaying Software 20686c6B is similar to the sequence of Device A's Location Phone Number Displaying Software 20686c6A. Device B's Location Information Sending Software 20686c7B is the software program described hereinafter. Device A's Location One Time Recording Software 20686c8B is the software program described hereinafter. Device A's Location Continuous Recording Software 20686c9B is the software program described hereinafter. The sequence of Device A's Location Displaying Software 20686c10B is similar to the sequence of Device B's Location Displaying Software 20686c10A. The sequence of Device A's Location Replaying Software 20686*c*11B is similar to the sequence of Device B's Location Replaying Software 20686*c*11A. The sequence of Device A's Location Street Address Displaying Software 20686*c*12B is similar to the sequence of Device B's Location Street Address Displaying Software 20686*c*12A. The sequence of Device A's Location Phone Number Displaying Software 20686*c*13B is similar to the sequence of Device B's Location Phone Number Displaying Software 20686*c*13A. The sequence of Device A's Location Info Sending/Receiving Software 20686*c*14B is similar to the sequence of Device B's Location Info Sending/Receiving Software 20686*c*14A.

This paragraph illustrates Device A's Location One Time Recording Software 20686*c*11A of Device A and Device A's Location One Time Recording Software 20686*c*8B of Device B, which store the current location of Device A for one time. In this embodiment, the user of Device A inputs a Device A's location one time recording signal (S1). Here, the Device A's location one time recording signal is a signal which instructs CPU 211 (FIG. 1) of Device A to initiate implementing the following steps. CPU 211 (FIG. 1) of Device A identifies the current time and stores the data in column 'Time Data' (e.g., Time Data#11) of Device A's Location Data Storage Area 20686*b*1A (S2). CPU 211 of Device A identifies the current geographic location data of Device A and stores the data in column 'Device A's Location Data' (e.g., Device A's Location Data#1) of Device A's Location Data Storage Area 20686*b*1A (S3). CPU 211 of Device A retrieves the time data and the Device A's location data from Device A's Location Data Storage Area 20686*b*1A and sends the data to Device B via Antenna 218 (FIG. 1) (S4). CPU 211 of Device B receives the time data and the Device A's location data from Device A and stores the data in Device A's Location Data Storage Area 20686*b*2B (S5).

This paragraph illustrates Device A's Location Continuous Recording Software 20686*c*2A of Device A and Device A's Location Continuous Recording Software 20686*c*9B of Device B, which continuously store the current location of Device A. In this embodiment, the user of Device A inputs a Device A's location continuous recording signal (Device A) (S1). Here, the Device A's location continuous recording signal is a signal which instructs CPU 211 (FIG. 1) of Device A to initiate implementing the following steps. CPU 211 of Device A identifies the current time and adds the data as a new time data in column 'Time Data' (e.g., Time Data#1) of Device A's Location Data Storage Area 20686*b*1A (S2). CPU 211 of Device A identifies the current geographic location data of Device A and adds the data as a new Device A's location data in column 'Device A's Location Data' (e.g., Device A's Location Data#11) of Device A's Location Data Storage Area 20686*b*1A (S3). CPU 211 of Device A retrieves the new time data and Device A's location data from Device A's Location Data Storage Area 20686*b*1A and sends the data to Device B via Antenna 218 (FIG. 1) (S4). The sequence of S2 through S4 is repeated Periodically (S5).

This paragraph illustrates Device A's Location Displaying Software 20686*c*3A of Device A, which displays the current location of Device A on LCD 201 (FIG. 1) of Device A. In this embodiment, CPU 211 (FIG. 1) of Device A retrieves all time data from Device A's Location Data Storage Area 20686*b*1A and displays a list of time data on LCD 201 (FIG. 1) (S1). The user of Device A selects a time data (e.g., Time Data#1) by utilizing Input Device 210 (FIG. 1) or via voice recognition system (S2). CPU 211 of Device A retrieves the corresponding Device A's location data (e.g., Device A's Location Data#1) (S3). CPU 211 of Device A retrieves the 3D map data from 3D Map Data Storage Area 20686*b*3A and displays the data on LCD 201 (FIG. 1) of Device A (S4). CPU 211 of Device A retrieves Icon Image Data#1 from Icon Image Data Storage Area 20686*b*6A (S5), and displays the data on LCD 201 of Device A at the location corresponding to the Device A's location data (e.g., Device A's Location Data#1) retrieved in S3 (S6).

This paragraph illustrates Device A's Location Replaying Software 20686*c*4A of Device A, which replays the location of Device A. In this embodiment, CPU 211 (FIG. 1) of Device A retrieves the 3D map from 3D Map Data Storage Area 20686*b*3A and the data is displayed on LCD 201 (FIG. 1) of Device A (S1). CPU 211 of Device A retrieves the 1st time data (e.g., Time Data#1) stored in Device A's Location Data Storage Area 20686*b*1A (S2). CPU 211 of Device A retrieves the corresponding Device A's location data (e.g., Device A's Location Data#1) (S3). CPU 211 of Device A retrieves Icon Image Data#1 from Icon Image Data Storage Area 20686*b*6A (S4), and displays the data on LCD 201 of Device A at the location corresponding to Device A's location data (e.g., Device A's Location Data#1) retrieved in S3 (S5). The sequence of S2 through S5 is performed with the 2nd time data (e.g., Time Data#2), the 3rd time data (e.g., Time Data#3), and the 4th time data (e.g., Time Data#4) (S6).

This paragraph illustrates Device A's Location Street Address Displaying Software 20686*c*5A of Device A, which displays the street address of the premises (e.g., a hotel or a restaurant) where Device A is currently located. In this embodiment, CPU 211 of Device A retrieves all time data from Device A's Location Data Storage Area 20686*b*1A and displays a list of time data on LCD 201 (FIG. 1) of Device A (S1). The user of Device A selects a time data (e.g., Time Data#1) by utilizing Input Device 210 (FIG. 1) or via voice recognition system (S2). CPU 211 of Device A retrieves the corresponding Device A's location data (e.g., Device A's Location Data#1) (S3). CPU 211 of Device A identifies the closest street address location data (e.g., Street Address Location Data#1) stored in Street Address Location Storage Area 20686*b*4A (S4). CPU 211 of Device A retrieves the corresponding street address data (e.g., Street Address Data#1) from Street Address Location Storage Area 20686*b*4A and displays the data on LCD 201 (FIG. 1) of Device A (S5).

This paragraph illustrates Device A's Location Phone Number Displaying Software 20686*c*6A of Device A, which displays the phone number of the premises (e.g., a hotel or restaurant) where Device A is currently located. In this embodiment, CPU 211 (FIG. 1) of Device A retrieves all time data from Device A's Location Data Storage Area 20686*b*1A and displays a list of time data on LCD 201 (FIG. 1) of Device A (S1). The user of Device A selects a time data (e.g., Time Data#1) by utilizing Input Device 210 (FIG. 1) or via voice recognition system (S2). CPU 211 of Device A retrieves the corresponding Device A's location data (e.g., Device A's Location Data#1) (S3). CPU 211 of Device A identifies the closest phone number location data (e.g., Phone Number Location Data#1) stored in Phone Number Location Storage Area 20686*b*5A (S4). CPU 211 of Device A retrieves the corresponding phone number data (e.g., Phone Number Data#11) from Phone Number Location Storage Area 20686*b*5A and displays the data on LCD 201 (FIG. 1) of Device A (S5).

This paragraph illustrates Device A's Location Information Sending/Receiving Software 20686*c*7A of Device A and Device A's Location Information Sending Software 20686*c*B of Device B, which send the Device A's location data, the Device A's location street address, and the Device A's location phone number to Device B. In this embodiment, CPU 211 of Device A retrieves all time data from Device A's Location Data Storage Area 20686b1A and displays a list of time data on LCD 201 (FIG. 1) of Device A (S1). The user of Device A selects a time data (e.g., Time Data#1) by utilizing Input Device 210 (FIG. 1) or via voice recognition system (S2). CPU 211 of Device A retrieves the corresponding Device A's location data (e.g., Device A's Location Data#1) (S3). CPU 211 of Device A identifies the closest street address location data (e.g., Street Address Location Data#1) stored in Street Address Location Storage Area 20686b4A (S4). CPU 211 of Device A retrieves the corresponding street address data (e.g., Street Address Data#1) from Street Address Location Storage Area 20686b4A and displays the data on LCD 201 (FIG. 1) of Device A (S5). CPU 211 of Device A identifies the closest phone number location data (e.g., Phone Number Location Data#1) stored in Phone Number Location Storage Area 20686b5A (S6). CPU 211 of Device A retrieves the corresponding phone number data (e.g., Phone Number Data#1) from Phone Number Location Storage Area 20686b5A and displays the data on LCD 201 (FIG. 1) of Device A (S7). CPU 211 of Device A sends the Device A's location data, the Device A's location street address, and the Device A's location phone number, which are received by Device B (S8).

This paragraph illustrates Device B's Location One Time Recording Software 20686c8A of Device A and Device B's Location One Time Recording Software 20686c1B of Device B, which store the current location of Device B for one time. In this embodiment, the user of Device B inputs a Device B's location one time recording signal (S1). Here, the Device B's location one time recording signal is a signal which instructs CPU 211 (FIG. 1) of Device B to initiate implementing the following steps. CPU 211 (FIG. 1) of Device B identifies the current time and stores the data in column 'Time Data' (e.g., Time Data#5) of Device B's Location Data Storage Area 20686b1B (S2). CPU 211 of Device B identifies the current geographic location data of Device B and stores the data in column 'Device B's Location Data' (e.g., Device B's Location Data#5) of Device B's Location Data Storage Area 20686b1B (S3). CPU 211 of Device B retrieves the time data and the Device B's location data from Device B's Location Data Storage Area 20686b1B and sends the data to Device A via Antenna 218 (FIG. 1) (S4). CPU 211 of Device A receives the time data and the Device B's location data from Device B and stores the data in Device B's Location Data Storage Area 20686b2A (S5).

This paragraph illustrates Device B's Location Continuous Recording Software 20686c9A of Device A and Device B's Location Continuous Recording Software 20686c2B of Device B, which continuously store the current location of Device B. In this embodiment, the user of Device B inputs a Device B's location continuous recording signal (S1). Here, the Device B's location continuous recording signal is a signal which instructs CPU 211 (FIG. 1) of Device B to initiate implementing the following steps. CPU 211 (FIG. 1) of Device B identifies the current time and adds the data as a new time data in column 'Time Data' (e.g., Time Data#5) of Device B's Location Data Storage Area 20686bB (S2). CPU 211 of Device B identifies the current geographic location data of Device B and adds the data as a new Device B's location data in column 'Device B's Location Data' (e.g., Device B's Location Data#5) of Device B's Location Data Storage Area 20686b1B (S3). CPU 211 of Device B retrieves the new time data and Device B's location data from Device B's Location Data Storage Area 20686b1B and sends the data to Device A via Antenna 218 (FIG. 1) (S4). The sequence of S2 through S4 is repeated Periodically (S5).

This paragraph illustrates Device B's Location Displaying Software 20686c10A of Device A, which displays the current location of Device B on LCD 201 (FIG. 1) of Device A. In this embodiment, CPU 211 (FIG. 1) of Device A retrieves all time data from Device B's Location Data Storage Area 20686b2A and displays a list of time data on LCD 201 (FIG. 1) of Device A (S1). The user of Device A selects a time data (e.g., Time Data#5) by utilizing Input Device 210 (FIG. 1) or via voice recognition system (S2). CPU 211 of Device A retrieves the corresponding Device B's location data (e.g., Device B's Location Data#5) (S3). CPU 211 of Device A retrieves the 3D map data from 3D Map Data Storage Area 20686b3A and displays the data on LCD 201 (FIG. 1) of Device A (S4). CPU 211 of Device A retrieves Icon Image Data#2 from Icon Image Data Storage Area 20686b6A (S5). CPU 211 of Device A displays the data on LCD 201 of Device A at the location corresponding to the Device B's Location Data (e.g., Device B's Location Data#5) retrieved in S3 (S6).

This paragraph illustrates Device B's Location Replaying Software 20686c11A of Device A, which replays the location of Device B. In this embodiment, CPU 211 (FIG. 1) of Device A retrieves the 3D map data from 3D Map Data Storage Area 20686b3A and displays the data on LCD 201 (FIG. 1) of Device A (S1). CPU 211 of Device A retrieves the 1st time data (e.g., Time Data#5) stored in Device B's Location Data Storage Area 20686b2A (S2). CPU 211 of Device A retrieves the corresponding Device B's location data (e.g., Device B's Location Data#5) (S3). CPU 211 of Device A retrieves Icon Image Data#2 from Icon Image Data Storage Area 20686b6A (S4). CPU 211 of Device A displays the date on LCD 201 of Device A at the location corresponding to the Device B's location data (e.g., Device B's Location Data#5) retrieved in S3 (S5). The sequence of S2 through S5 is repeated with the 2nd time data (e.g., Time Data#6), the 3rd time data (e.g., Time Data#7), and the 4th time data (e.g., Time Data#8) (S6).

This paragraph illustrates Device B's Location Street Address Displaying Software 20686c12A of Device A, which displays the street address of the premises (e.g., a hotel or restaurant) where Device B is currently located. In this embodiment, CPU 211 (FIG. 1) of Device A retrieves all time data from Device B's Location Data Storage Area 20686b2A and displays a list of time data on LCD 201 (FIG. 1) of Device A (S1). The user of Device A selects a time data (e.g., Time Data#5) by utilizing Input Device 210 (FIG. 1) or via voice recognition system (S2). CPU 211 of Device A retrieves the corresponding Device B's location data (e.g., Device B's Location Data#5) (S3). CPU 211 of Device A identifies the closest street address location data (e.g., Street Address Location Data#5) stored in Street Address Location Storage Area 20686b4A (S4). CPU 211 of Device A retrieves the corresponding street address data (e.g., Street Address Data#5) from Street Address Location Storage Area 20686b4A and displays the data on LCD 201 (FIG. 1) of Device A (S5).

This paragraph illustrates Device B's Location Phone Number Displaying Software 20686c13A of Device A, which displays the phone number of the premises (e.g., a hotel or restaurant) where Device B is currently located. In this embodiment, CPU 211 (FIG. 1) of Device A retrieves all time data from Device B's Location Data Storage Area 20686b2A and displays a list of time data on LCD 201 (FIG. 1) of Device A (S1). The user of Device A selects a time data (e.g., Time Data#5) by utilizing Input Device 210 (FIG. 1) or via voice recognition system (S2). CPU 211 of Device A retrieves the corresponding Device B's location data (e.g., Device B's Location Data#5) (S3). CPU 211 of Device A identifies the closest phone number location data (e.g., Phone Number Location Data#5) stored in Phone Number Location Storage Area 20686b5A (S4). CPU 211 of Device A retrieves the corresponding phone number data (e.g., Phone Number Data#5) from Phone Number Location Storage Area 20686b5A and displays the data on LCD 201 (FIG. 1) of Device A (S5).

This paragraph illustrates Device B's Location Information Sending/Receiving Software 20686c14A of Device A and Device B's Location Information Sending Software 20686c7B of Device B, which send the Device B's location data, the Device B's location street address, and the Device B's location phone number to Device A. In this embodiment, CPU 211 (FIG. 1) of Device B retrieves all time data from Device B's Location Data Storage Area 20686b2B and displays a list of time data on LCD 201 (FIG. 1) of Device B (S1). The user of Device B selects a time data (e.g., Time Data#5) by utilizing Input Device 210 (FIG. 1) or via voice recognition system (S2). CPU 211 of Device B retrieves the corresponding Device B's location data (e.g., Device B's Location Data#5) (S3). CPU 211 of Device B identifies the closest street address location data (e.g., Street Address Location Data#5) stored in Street Address Location Storage Area 20686b4B (S4). CPU 211 of Device B retrieves the corresponding street address data (e.g., Street Address Data#5) from Street Address Location Storage Area 20686b4B and displays the data on LCD 201 (FIG. 1) of Device B (S5). CPU 211 of Device B identifies the closest phone number location data (e.g., Phone Number Location Data#5) stored in Phone Number Location Storage Area 20686b5B (S6). CPU 211 of Device B retrieves the corresponding phone number data (e.g., Phone Number Data#5) from Phone Number Location Storage Area 20686b5B and displays the data on LCD 201 (FIG. 1) of Device B (S7). CPU 211 of Device B sends the Device B's location data, the Device B's location street address, and the Device B's location phone number, which are received by Device A (S8).

<<CCD Dictionary Function>>

The following paragraphs illustrate the CCD dictionary function which enables the user of Communication Device 200 to utilize Communication Device 200 as a language dictionary.

This paragraph illustrates the storage area included in Host H. In this embodiment, Host H includes CCD Dictionary Information Storage Area H87a of which the data and the software programs stored therein are described hereinafter.

This paragraph illustrates the storage areas included in CCD Dictionary Information Storage Area H87a. In this embodiment, CCD Dictionary Information Storage Area H87a includes CCD Dictionary Data Storage Area H87b and CCD Dictionary Software Storage Area H87c. CCD Dictionary Data Storage Area H87b stores the data necessary to implement the present function on the side of Host H, such as the ones described hereinafter. CCD Dictionary Software Storage Area H87c stores the software programs necessary to implement the present function on the side of Host H, such as the ones described hereinafter.

This paragraph illustrates the storage areas included in CCD Dictionary Data Storage Area H87b. In this embodiment, CCD Dictionary Data Storage Area H87b includes Dictionary Data Storage Area H87b1 and Work Area H87b2. Dictionary Data Storage Area H87b1 stores the data described hereinafter. Work Area H87b2 is utilized as a work area to perform calculation and temporarily store data.

This paragraph illustrates the storage areas included in Dictionary Data Storage Area H87b1. In this embodiment, Dictionary Data Storage Area H87b1 includes English/English Dictionary Data Storage Area H87b1a and English/Japanese Dictionary Data Storage Area H87b1b. English/English Dictionary Data Storage Area H87b1a stores the data described hereinafter. English/Japanese Dictionary Data Storage Area H87b1b stores the data described hereinafter.

This paragraph illustrates the data stored in English/English Dictionary Data Storage Area H87b1a. In this embodiment, English/English Dictionary Data Storage Area H87b1a comprises two columns, i.e., 'English Term' and 'English Explanation Data'. Column 'English Term' stores the English terms, and each English term represents an English word. Each English term includes alphanumeric data. Column 'English Explanation Data' stores the English explanation data, and each English explanation data represents the explanation in English of the corresponding English term. Each English explanation data includes alphanumeric data. In this embodiment, English/English Dictionary Data Storage Area H87b1a stores the following data: the English term 'English Term#1' and the corresponding English explanation data 'English Explanation Data#1'; the English term 'English Term#2' and the corresponding English explanation data 'English Explanation Data#2'; the English term 'English Term#3' and the corresponding English explanation data 'English Explanation Data#3'; and the English term 'English Term#4' and the corresponding English explanation data 'English Explanation Data#4'.

This paragraph illustrates the data stored in English/Japanese Dictionary Data Storage Area H87b1b. In this embodiment, English/Japanese Dictionary Data Storage Area H87b1b comprises two columns, i.e., 'English Term' and 'Japanese Explanation Data'. Column 'English Term' stores the English terms, and each English term represents an English word. Each English term includes alphanumeric data. The English terms stored in English/Japanese Dictionary Data Storage Area H87b1b are identical to the ones stored in English/English Dictionary Data Storage Area H87b1a. Column 'Japanese Explanation Data' stores the Japanese explanation data, and each Japanese explanation data represents the explanation in Japanese of the corresponding English term. Each Japanese explanation data includes alphanumeric data. In this embodiment, English/Japanese Dictionary Data Storage Area H87b1b stores the following data: the English term 'English Term#1' and the corresponding Japanese explanation data 'Japanese Explanation Data#1'; the English term 'English Term#2' and the corresponding Japanese explanation data 'Japanese Explanation Data#2'; the English term 'English Term#3' and the corresponding Japanese explanation data 'Japanese Explanation Data#3'; and the English term 'English Term#4' and the corresponding Japanese explanation data 'Japanese Explanation Data#4'.

This paragraph illustrates the software programs stored in CCD Dictionary Software Storage Area H87c. In this embodiment, CCD Dictionary Software Storage Area H87c stores Dictionary Data Downloading Software H87c1 and Explanation Data Retrieving Software H87c2. Dictionary Data Downloading Software H87c1 is the software program described hereinafter. Explanation Data Retrieving Software H87c2 is the software program described hereinafter.

This paragraph illustrates the storage area included in RAM 206 (FIG. 1) of Communication Device 200. In this embodiment, RAM 206 includes CCD Dictionary Information Storage Area 20687a of which the data and the software programs stored therein are described hereinafter.

The data and/or the software programs stored in CCD Dictionary Information Storage Area 20687a may be downloaded from Host H.

This paragraph illustrates the storage areas included in CCD Dictionary Information Storage Area 20687a. In this embodiment, CCD Dictionary Information Storage Area 20687*a* includes CCD Dictionary Data Storage Area 20687*b* and CCD Dictionary Software Storage Area 20687*c*. CCD Dictionary Data Storage Area 20687*b* stores the data necessary to implement the present function on the side of Communication Device 200, such as the ones described hereinafter. CCD Dictionary Software Storage Area 20687*c* stores the software programs necessary to implement the present function on the side of Communication Device 200, such as the ones described hereinafter.

This paragraph illustrates the storage areas included in CCD Dictionary Data Storage Area 20687*b*. In this embodiment, CCD Dictionary Data Storage Area 20687*b* includes Dictionary Data Storage Area 20687*b*1 and Work Area 20687*b*2. Dictionary Data Storage Area 20687*b*1 stores the data described hereinafter. Work Area 20687*b*2 is utilized as a work area to perform calculation and temporarily store data.

This paragraph illustrates the storage areas included in Dictionary Data Storage Area 20687*b*1. In this embodiment, Dictionary Data Storage Area 20687*b*1 includes English/English Dictionary Data Storage Area 20687*b*1*a* and English/Japanese Dictionary Data Storage Area 20687*b*1*b*. English/English Dictionary Data Storage Area 20687*b*1*a* stores the data described hereinafter. English/Japanese Dictionary Data Storage Area 20687*b*1*b* stores the data described hereinafter.

This paragraph illustrates the data stored in English/English Dictionary Data Storage Area 20687*b*1*a*. In this embodiment, English/English Dictionary Data Storage Area 20687*b*1*a* comprises two columns, i.e., 'English Term' and 'English Explanation Data'. Column 'English Term' stores the English terms, and each English term represents an English word. Each English term includes alphanumeric data. Column 'English Explanation Data' stores the English explanation data, and each English explanation data represents the explanation in English of the corresponding English term. Each English explanation data includes alphanumeric data. In this embodiment, English/English Dictionary Data Storage Area 20687*b*1*a* stores the following data: the English term 'English Term#1' and the corresponding English explanation data 'English Explanation Data#1'; the English term 'English Term#2' and the corresponding English explanation data 'English Explanation Data#2'; the English term 'English Term#3' and the corresponding English explanation data 'English Explanation Data#3'; and the English term 'English Term#4' and the corresponding English explanation data 'English Explanation Data#4'.

This paragraph illustrates the data stored in English/Japanese Dictionary Data Storage Area 20687*b*1*b*. In this embodiment, English/Japanese Dictionary Data Storage Area 20687*b*1*b* comprises two columns, i.e., 'English Term' and 'Japanese Explanation Data'. Column 'English Term' stores the English terms, and each English term represents an English word. Each English term includes alphanumeric data. The English terms stored in English/Japanese Dictionary Data Storage Area 20687*b*1*b* are identical to the ones stored in English/English Dictionary Data Storage Area 20687*b*1*a*. Column 'Japanese Explanation Data' stores the Japanese explanation data, and each Japanese explanation data represents the explanation in Japanese of the corresponding English term. Each Japanese explanation data includes alphanumeric data. In this embodiment, English/Japanese Dictionary Data Storage Area 20687*b*1*b* stores the following data: the English term 'English Term#1' and the corresponding Japanese explanation data 'Japanese Explanation Data#1'; the English term 'English Term#2' and the corresponding Japanese explanation data 'Japanese Explanation Data#2'; the English term 'English Term#3' and the corresponding Japanese explanation data 'Japanese Explanation Data#3'; and the English term 'English Term#4' and the corresponding Japanese explanation data 'Japanese Explanation Data#4'.

This paragraph illustrates the software programs stored in CCD Dictionary Software Storage Area 20687*c*. In this embodiment, CCD Dictionary Software Storage Area 20687*c* stores Dictionary Data Downloading Software 20687*c*1, Explanation Data Retrieving Software 20687*c*2, and CCD Dictionary Software 20687*c*3. Dictionary Data Downloading Software 20687*c*1 is the software program described hereinafter. Explanation Data Retrieving Software 20687*c*2 is the software program described hereinafter. CCD Dictionary Software 20687*c*3 is the software program described hereinafter.

This paragraph illustrates Dictionary Data Downloading Software H87*c*1 of Host H and Dictionary Data Downloading Software 20687*c*1 of Communication Device 200, which download the data stored in Dictionary Data Storage Area H87*b*1. In this embodiment, CPU 211 (FIG. 1) of Communication Device 200 sends, in a wireless fashion via Antenna 218 (FIG. 1), a dictionary data downloading request, which is received by Host H (S1). Here, the dictionary data downloading request is a request to download the data stored in Dictionary Data Storage Area H87*b*1 of Host H. In response, Host H retrieves all data from Dictionary Data Storage Area H87*b*1 and sends the data to Communication Device 200 (S2). CPU 211 receives the data and stores them in Dictionary Data Storage Area 20687*b*1 (S3).

This paragraph illustrates Explanation Data Retrieving Software 20687*c*2 of Communication Device 200, which displays on LCD 201 (FIG. 1) the explanations of the English term input by utilizing Input Device 210 (FIG. 1) or via voice recognition system. In this embodiment, the user of Communication Device 200 inputs an English term (e.g., English Term#1) by utilizing Input Device 210 (FIG. 1) or via voice recognition system (S1). CPU 211 (FIG. 1) of Communication Device 200 searches English/English Dictionary Data Storage Area 20687*b*1*a* for the matching term (S2). CPU 211 then searches English/Japanese Dictionary Data Storage Area 20687*b*1*b* for the matching term (S3). CPU 211 stores the corresponding English explanation data (e.g., English Explanation Data#1) in Work Area 20687*b*2 (S4). CPU 211 stores the corresponding Japanese explanation data (e.g., Japanese Explanation Data#1) in Work Area 20687*b*2 (S5). CPU 211 retrieves the corresponding English explanation data (e.g., English Explanation Data#1) and the corresponding Japanese explanation data (e.g., Japanese Explanation Data#1) from Work Area 20687*b*2 and displays both data on LCD 201 (FIG. 1) (S6).

This paragraph illustrates CCD Dictionary Software 20687*c*3 of Communication Device 200, which displays on LCD 201 (FIG. 1) the explanations of the English term input via CCD Unit 214 (FIG. 1). In this embodiment, CPU 211 (FIG. 1) of Communication Device 200 inputs an image data from CCD Unit 214 (FIG. 1) (S1). CPU 211 stores the image data input In S1 in Work Area 20687*b*2 (S2), and converts the image data to text data and retrieves an English term (e.g., English Term#1) therefrom (S3). CPU 211 searches English/English Dictionary Data Storage Area 20687*b*1*a* for the matching term (S4). CPU 211 then searches English/Japanese Dictionary Data Storage Area 20687*b*1*b* for the matching term (S5). CPU 211 stores the corresponding English explanation data (e.g., English Explanation Data#1) in Work Area 20687*b*2 (S6). CPU 211 stores the corresponding Japanese explanation data (e.g., Japanese Explanation Data#1) in Work Area 20687*b*2 (S7). CPU 211 retrieves the corresponding English explanation data and the corresponding Japanese explanation data from Work Area 20687b2 and displays both data on LCD 201 (FIG. 1) (S8).

This paragraph illustrates Explanation Data Retrieving Software H87c2 of Host H and Explanation Data Retrieving Software 20687c2 of Communication Device 200, which display on LCD 201 (FIG. 1) the explanations of the English term input by utilizing Input Device 210 (FIG. 1) or via voice recognition system. The explanation data are retrieved from Host H in this embodiment. In this embodiment, the user of Communication Device 200 inputs an English term (e.g., English Term#1) by utilizing Input Device 210 (FIG. 1) or via voice recognition system (S1). CPU 211 (FIG. 1) of Communication Device 200 sends, in a wireless fashion via Antenna 218 (FIG. 1), the English term (e.g., English Term#1) input In S1, which is received by Host H (S2). Host H searches English/English Dictionary Data Storage Area H87b1a for the matching term (S3). Host H searches English/Japanese Dictionary Data Storage Area H87b1b for the matching term (S4). Host H sends the corresponding English explanation data (e.g., English Explanation Data#1) and the corresponding Japanese explanation data (e.g., Japanese Explanation Data#1), which are received by Communication Device 200 (S5). CPU 211 of Communication Device 200 stores the corresponding English explanation data (e.g., English Explanation Data#1) in Work Area 20687b2 (S6). CPU 211 stores the corresponding Japanese explanation data (e.g., Japanese Explanation Data#11) in Work Area 20687b2 (S7). CPU 211 retrieves the corresponding English explanation data and the corresponding Japanese explanation data from Work Area 20687b2 and displays both data on LCD 201 (FIG. 1) (S8).

This paragraph illustrates Explanation Data Retrieving Software H87c2 of Host H and CCD Dictionary Software 20687c3 of Communication Device 200, which display on LCD 201 (FIG. 1) the explanations of the English term input via CCD Unit 214 (FIG. 1). The explanation data are retrieved from Host H in this embodiment. In this embodiment, CPU 211 (FIG. 1) of Communication Device 200 inputs an image data from CCD Unit 214 (FIG. 1) (S1). CPU 211 stores the image data input In S1 in Work Area 20687b2 (S2), and converts the image data to text data and retrieves an English term (e.g., English Term#1) therefrom (S3). CPU 211 sends, in a wireless fashion via Antenna 218 (FIG. 1), the English term (e.g., English Term#1) input In S1, which is received by Host H (S4). Host H searches English/English Dictionary Data Storage Area H87b1a for the matching term (S5). Host H searches English/Japanese Dictionary Data Storage Area H87b1b for the matching term (S6). Host H sends the corresponding English explanation data (e.g., English Explanation Data#1) and the corresponding Japanese explanation data (e.g., Japanese Explanation Data#1), which are received by Communication Device 200 (S7). CPU 211 of Communication Device 200 stores the corresponding English explanation data (e.g., English Explanation Data#1) in Work Area 20687b2 (S8). CPU 211 stores the corresponding Japanese explanation data (e.g., Japanese Explanation Data#1) in Work Area 20687b2 (S9). CPU 211 retrieves the corresponding English explanation data and the corresponding Japanese explanation data from Work Area 20687b2 and displays both data on LCD 201 (FIG. 1) (S10).

<<Schedule Notifying Function>>

The following paragraphs illustrate the schedule notifying function which enables the user of Communication Device 200 to register his/her schedule via his/her personal computer (e.g., a desktop computer, a PDA, a laptop computer, Communication Device 200 described hereinafter and another Communication Device 200) and display a notice on Communication Device 200 when the registered schedule is about to start.

This paragraph illustrates the connections of Personal Computer PC88, Network NT, Host H, and Communication Device 200. In this embodiment, Personal Computer PC88 is connected to Network NT (e.g., the Internet). Host H is connected to Network NT. Communication Device 200 is connected to Network NT in a wireless fashion. Personal Computer PC88 and Host H are capable to send and receive data via Network NT. Host H and Communication Device 200 are capable to send and receive data via Network NT. Here, Personal Computer PC88 may be any computer, such as a desktop computer, a PDA, a laptop computer, Communication Device 200 described hereinafter or another Communication Device 200.

This paragraph illustrates the storage areas included in Personal Computer PC88. In this embodiment, Personal Computer PC88 includes Work Area PC88b and Software Storage Area PC88c. Work Area PC88b is utilized as a work area to perform calculation and temporarily store data. Software Storage Area PC88c stores the software programs necessary to implement the present function on the side of Host H, such as the one described hereinafter.

This paragraph illustrates the software programs stored in Software Storage Area PC88c. In this embodiment, Software Storage Area PC88c stores Schedule Data Inputting Software PC88c1. Schedule Data Inputting Software PC88c1 is the software program described hereinafter.

This paragraph illustrates the storage area included in Host H. In this embodiment, Host H includes Schedule Notifying Information Storage Area H88a of which the data and the software programs stored therein are described hereinafter.

This paragraph illustrates the storage areas included in Schedule Notifying Information Storage Area H88a. In this embodiment, Schedule Notifying Information Storage Area H88a includes Schedule Notifying Data Storage Area H88b and Schedule Notifying Software Storage Area H88c. Schedule Notifying Data Storage Area H88b stores the data necessary to implement the present function on the side of Host H, such as the ones described hereinafter. Schedule Notifying Software Storage Area H88c stores the software programs necessary to implement the present function on the side of Host H, such as the ones described hereinafter.

This paragraph illustrates the storage areas included in Schedule Notifying Data Storage Area H88b. In this embodiment, Schedule Notifying Data Storage Area H88b includes Users' Schedule Data Storage Area H88b1 and Work Area H88b2. Users' Schedule Data Storage Area H88b1 stores the data necessary to implement the present function on the side of Host H, such as the ones described hereinafter. Work Area H88b2 is utilized as a work area to perform calculation and temporarily store data.

This paragraph illustrates the storage areas included in Users' Schedule Data Storage Area H88b1. Users' Schedule Data Storage Area H88b1 stores the schedule data of each user (e.g., user#1 and user#2). Here, the schedule data includes the starting time data, the ending time data, the place data, the title data, and the memo data. The starting time data represents the starting time of the schedule represented by the title data. The ending time data represents the ending time of the schedule represented by the title data. The place data represents the place at which the schedule represented by the title data takes place. The title data represents the title of the schedule data. The memo data represents the alphanumeric data which the user inputs for a memorandum. In this embodiment, Users' Schedule Data Storage Area H88b1 includes User#1's Schedule Data Storage Area H88b1a and User#2's Schedule Data Storage Area H88b1b. User#1's Schedule Data Storage Area H88b1a stores the schedule data of user#1, of which the data stored therein are described hereinafter. User#2's Schedule Data Storage Area H88b1b stores the schedule data of user#2, of which the data stored therein are described hereinafter.

This paragraph illustrates the data stored in User#1's Schedule Data Storage Area H88b1a. In this embodiment, User#1's Schedule Data Storage Area H88b1a comprises two columns, i.e., 'User#1's Schedule ID' and 'User#1's Schedule Data'. Column 'User#1's Schedule ID' stores the user#1's schedule IDs, and each user#1's schedule ID is an identification of the corresponding user#1's schedule data stored in column 'User#1's Schedule Data'. Column 'User#1's Schedule Data' stores the schedule data of user#1 of which the data included therein are described hereinafter. In this embodiment, User#1's Schedule Data Storage Area H88b1a stores the following data: the user#1's schedule ID 'User#1's Schedule#1' and the corresponding user#1's schedule data 'User#1's Schedule Data#1'; the user#1's schedule ID 'User#1's Schedule#2' and the corresponding user#1's schedule data 'User#1's Schedule Data#2'; the user#1's schedule ID 'User#1's Schedule#3' and the corresponding user#1's schedule data 'User#1's Schedule Data#3'; and the user#1's schedule ID 'User#1's Schedule#4' and the corresponding user#1's schedule data 'User#1's Schedule Data#4'.

This paragraph illustrates the data stored in User#2's Schedule Data Storage Area H88b1b. In this embodiment, User#2's Schedule Data Storage Area H88b1b comprises two columns, i.e., 'User#2's Schedule ID' and 'User#2's Schedule Data'. Column 'User#2's Schedule ID' stores the user#2's schedule IDs, and each user#2's schedule ID is an identification of the corresponding user#2's schedule data stored in column 'User#2's Schedule Data'. Column 'User#2's Schedule Data' stores the schedule data of user#2. In this embodiment, User#2's Schedule Data Storage Area H88b1b stores the following data: the user#2's schedule ID 'User#2's Schedule#1' and the corresponding user#2's schedule data 'User#2's Schedule Data#1'; the user#2's schedule ID 'User#2's Schedule#2' and the corresponding user#2's schedule data 'User#2's Schedule Data#2'; the user#2's schedule ID 'User#2's Schedule#3' and the corresponding user#2's schedule data 'User#2's Schedule Data#3'; and the user#2's schedule ID 'User#2's Schedule#4' and the corresponding user#2's schedule data 'User#2's Schedule Data#4'.

This paragraph illustrates an example of the schedule data stored in User#1's Schedule Data Storage Area H88b1a and User#2's Schedule Data Storage Area H88b1b taking the user#1's schedule data 'User#1's Schedule Data#4' as an example. Here, the user#1's schedule data 'User#1's Schedule Data#4' includes the starting time data 'Starting Time Data#4a', the ending time data 'Ending Time Data#4b', the place data 'Place Data#4c', the title data 'Title Data#4d', and the memo data 'Memo Data#4e'. The starting time data 'Starting Time Data#4a' represents the starting time of the schedule represented by the title data 'Title Data#4d'. The ending time data 'Ending Time Data#4b' represents the ending time of the schedule represented by the title data 'Title Data#4d. The place data 'Place Data#4c' represents the place at which the schedule represented by the title data 'Title Data#4d takes place. The title data 'Title Data#4d' represents the title of the schedule data 'User#1's Schedule Data#4' of User#1. The memo data 'Memo Data#4c' represents the alphanumeric data which the user input for a memorandum.

This paragraph illustrates the software programs stored in Schedule Notifying Software Storage Area H88c. In this embodiment, Schedule Notifying Software Storage Area H88c stores Schedule Data Inputting Software H88c1, Schedule Notifying Software H88c2, and Schedule Displaying Software H88c3. Schedule Data Inputting Software H88c1 is the software program described hereinafter. Schedule Notifying Software H88c2 is the software program described hereinafter. Schedule Displaying Software H88c3 is the software program described hereinafter.

This paragraph illustrates the storage area included in RAM 206 (FIG. 1) of Communication Device 200. In this embodiment, RAM 206 includes Schedule Notifying Information Storage Area 20688a of which the data and the software programs stored therein are described hereinafter.

The data and/or the software programs stored in Schedule Notifying Information Storage Area 20688a may be downloaded from Host H.

This paragraph illustrates the storage areas included in Schedule Notifying Information Storage Area 20688a. In this embodiment, Schedule Notifying Information Storage Area 20688a includes Schedule Notifying Data Storage Area 20688b and Schedule Notifying Software Storage Area 20688c. Schedule Notifying Data Storage Area 20688b stores the data necessary to implement the present function on the side of Communication Device 200, such as the ones described hereinafter. Schedule Notifying Software Storage Area 20688c stores the software programs necessary to implement the present function on the side of Communication Device 200, such as the ones described hereinafter.

This paragraph illustrates the storage areas included in Schedule Notifying Data Storage Area 20688b. In this embodiment, Schedule Notifying Data Storage Area 20688b includes User#1's Schedule Data Storage Area 20688b1a and Work Area 20688b2. User#1's Schedule Data Storage Area 20688b1a stores the data described hereinafter. Work Area 20688b2 is utilized as a work area to perform calculation and temporarily store data.

This paragraph illustrates the data stored in User#1's Schedule Data Storage Area 20688b1a. In this embodiment, User#1's Schedule Data Storage Area 20688b1a comprises two columns, i.e., 'User#1's Schedule ID' and 'User#1's Schedule Data'. Column 'User#1's Schedule ID' stores the user#1's schedule IDs, and each user#1's schedule ID is an identification of the corresponding user#1's schedule data stored in column 'User#1's Schedule Data'. Column 'User#1's Schedule Data' stores the schedule data of user#1 of which the data included therein are described hereinafter. In this embodiment, User#1's Schedule Data Storage Area 20688b1a stores the following data: the user#1's schedule ID 'User#1's Schedule#1' and the corresponding user#1's schedule data 'User#1's Schedule Data#1'; the user#1's schedule ID 'User#1's Schedule#2' and the corresponding user#1's schedule data 'User#1's Schedule Data#2'; the user#1's schedule ID 'User#1's Schedule#3' and the corresponding user#1's schedule data 'User#1's Schedule Data#3'; and the user#1's schedule ID 'User#1's Schedule#4' and the corresponding user#1's schedule data 'User#1's Schedule Data#4'.

This paragraph illustrates an example of the schedule data stored in User#1's Schedule Data Storage Area 20688b1a taking the user#1's schedule data 'User#1's Schedule Data#4' as an example. Here, the user#1's schedule data 'User#1's Schedule Data#4' includes the starting time data 'Starting Time Data#4a', the ending time data 'Ending Time Data#4b', the place data 'Place Data#4c', the title data 'Title Data#4d', and the memo data 'Memo Data#4c'. The starting time data 'Starting Time Data#4a' represents the starting time of the schedule represented by the title data 'Title Data#4d'. The ending time data 'Ending Time Data#4b' represents the ending time of the schedule represented by the title data 'Title Data#4d'. The place data 'Place Data#4c' represents the place at which the schedule represented by the title data Title Data#4d takes place. The title data 'Title Data#4d' represents the title of the schedule data 'User#1's Schedule Data#4' of User#1. The memo data 'Memo Data#4e' represents the alphanumeric data which the user input for a memorandum.

This paragraph illustrates the software programs stored in Schedule Notifying Software Storage Area 20688c. In this embodiment, Schedule Notifying Software Storage Area 20688c stores Schedule Notifying Software 20688c2 and Schedule Displaying Software 20688c3. Schedule Notifying Software 20688c2 is the software program described hereinafter. Schedule Displaying Software 20688c3 is the software program described hereinafter.

This paragraph illustrates Schedule Data Inputting Software H88c1 of Host H and Schedule Data Inputting Software PC88c1 of Personal Computer PC88, which input the schedule data of the user of Communication Device 200. In this embodiment, the user (e.g., user#1) inputs to Personal Computer PC88 a schedule data (e.g., Schedule Data#4), for example, the starting time data 'Starting Time Data#4a', the ending time data 'Ending Time Data#4b', the place data 'Place Data#4c', the title data 'Title Data#4d', and the memo data 'Memo Data#4e'. (S1). Personal Computer PC88 stores the schedule data (e.g., Schedule Data#4) input in S1 in Work Area PC88b (S2). Personal Computer PC88 retrieves the schedule data (e.g., Schedule Data#4) from Work Area PC88b and sends the data to Host H (S3). Host H receives the schedule data (e.g., Schedule Data#4) from Personal Computer PC88 and stores the data in User#1's Schedule Data Storage Area H88b1a (S4).

This paragraph illustrates Schedule Notifying Software H88c2 of Host H and Schedule Notifying Software 20688c2 of Personal Computer PC88, which display on LCD 201 (FIG. 1) of Communication Device 200 a notice when the registered schedule is about to start. In this embodiment, Host H scans the starting time data of each schedule data stored in Users' Schedule Data Storage Area H88b1 (S1). Host H compares the current time and the starting time data (e.g., Starting Time Data#4a) (S2). If the current time is predetermined time before the starting time data (e.g., five minutes before Starting Time Data#4a), Host H moves to the next step (S3). Host H sends a notice data, which is received by Communication Device 200 (S4). Here, the notice data is a data designed to be displayed on LCD 201 (FIG. 1) of Communication Device 200 which indicates that the schedule represented by the schedule data (e.g., Schedule Data#4) is about to start. CPU 211 (FIG. 1) of Communication Device 200 stores the notice data in Work Area 20688b2 and displays the data on LCD 201 (FIG. 1) (S5).

This paragraph illustrates Schedule Displaying Software H88c3 of Host H and Schedule Displaying Software 20688c3 of Communication Device 200, which display the schedule data on LCD 201 (FIG. 1) of Communication Device 200. In this embodiment, the user (e.g., user#1) of Communication Device 200 inputs a schedule data displaying signal by utilizing Input Device 210 (FIG. 1) or via voice recognition system (S1). Here, the schedule data displaying signal is a signal to display the schedule of the user (e.g., user#1) of Communication Device 200. In response, CPU 211 (FIG. 1) of Communication Device 200 sends a schedule data request, which is received by Host H (S2). Here, the schedule data request is a request to send all schedule data of the corresponding user (e.g., user#1) stored in Host H to Communication Device 200 in order for the schedule data to be displayed on LCD 201 (FIG. 1) of Communication Device 200. Host H retrieves all schedule data (e.g., User#1's Schedule Data#1 Through #4) of the corresponding user (e.g., User#1), which are sent to Communication Device 200 (S3). CPU 211 (FIG. 1) of Communication Device 200 receives the schedule data (e.g., User#1's Schedule Data#1 Through #4) from Host H and stores the data in User#1's Schedule Data Storage Area 20688b1a (S4). CPU 211 retrieves all schedule data (e.g., User#1's Schedule Data#1 Through #4) from User#1's Schedule Data Storage Area 20688b1a and displays the data on LCD 201 (FIG. 1) (S5).

<<Multiple Type TV Program Distributing System>>

This paragraph illustrates the connections between Host H and the three broadcast centers, i.e., Satellite TV Broadcast Center 94TVBC1, Ground Wave TV Broadcast Center 94TVBC2, and Cable TV Broadcast Center 94TVBC3. Satellite TV Broadcast Center 94TVBC1 is the broadcast center which broadcasts the satellite TV program data. Here, the satellite TV program data is the data distributed from Satellite TV Broadcast Center 94TVBC1 which is designed to be output from displays, such as TV monitors. Ground Wave TV Broadcast Center 94TVBC2 is the broadcast center which broadcasts the ground wave TV program data. Here, the ground wave TV program data is the data distributed from Ground Wave TV Broadcast Center 94TVBC2 which is designed to be output from displays, such as TV monitors. Cable TV Broadcast Center 94TVBC3 is the broadcast center which broadcasts the cable TV program data. Here, the cable TV program data is the data distributed from Cable TV Broadcast Center 94TVBC3 which is designed to be output from displays, such as TV monitors. The foregoing three broadcast centers broadcast the TV program data in their ordinary manner, and also distribute the same TV program data to Host H via Network NT (e.g., the Internet) in order for Communication Device 200 to display the TV program data by implementing the present system and/or the cellular TV function and other relevant functions described in this specification. Host H receives the TV program data from the foregoing three broadcast centers realtime, twenty-four hour a day and seven days a week of which the details are described hereinafter.

This paragraph illustrates another embodiment of the connection between Host H and Satellite TV Broadcast Center 94TVBC1. Satellite TV Broadcast Center 94TVBC1 is the broadcast center which broadcasts the satellite TV program data. Here, the satellite TV program data is the data distributed from Satellite TV Broadcast Center 94TVBC1 which is designed to be output from displays, such as TV monitors. Satellite TV Broadcast Center 94TVBC1 broadcasts the satellite TV program data in their ordinary manner via Artificial Satellite AS94, which is received by Host H in order for Communication Device 200 to display the satellite TV program data by implementing the present system and/or the cellular TV function and other relevant functions described in this specification.

This paragraph illustrates another embodiment of the connection between Host H and Ground Wave TV Broadcast Center 94TVBC2. Ground Wave TV Broadcast Center 94TVBC2 is the broadcast center which broadcasts the ground wave TV program data. Here, the ground wave TV program data is the data distributed from Ground Wave TV Broadcast Center 94TVBC2 which is designed to be output from displays, such as TV monitors. Ground Wave TV Broadcast Center 94TVBC2 broadcasts the ground wave TV program data in their ordinary manner via Antenna Ant94, which is received by Host H in order for Communication Device 200 to display the ground wave TV program data by implementing the present system and/or the cellular TV function and other relevant functions described in this specification.

This paragraph illustrates another embodiment of the connection between Host H and Cable TV Broadcast Center 94TVBC3. Cable TV Broadcast Center 94TVBC3 is the broadcast center which broadcasts the cable TV program data. Here, the cable TV program data is the data distributed from Cable TV Broadcast Center 94TVBC3 which is designed to be output from displays, such as TV monitors. Cable TV Broadcast Center 94TVBC3 broadcasts the cable TV program data in their ordinary manner via Cable Cbl94, which is received by Host H in order for Communication Device 200 to display the cable TV program data by implementing the present system and/or the cellular TV function and other relevant functions described in this specification.

This paragraph illustrates the storage area included in Host H. In this embodiment, Host H includes Multiple Type TV Program Information Storage Area H94a of which the data and the software programs stored therein are described hereinafter.

This paragraph illustrates the storage areas included in Multiple Type TV Program Information Storage Area H94a. In this embodiment, Multiple Type TV Program Information Storage Area H94a includes Multiple Type TV Program Data Storage Area H94b and Multiple Type TV Program Data Software Storage Area H94c. Multiple Type TV Program Data Storage Area H94b stores the data necessary to implement the present function on the side of Host H, such as the ones described hereinafter. Multiple Type TV Program Data Software Storage Area H94c stores the software programs necessary to implement the present function on the side of Host H, such as the ones described hereinafter.

This paragraph illustrates the storage areas included in Multiple Type TV Program Data Storage Area H94b. In this embodiment, Multiple Type TV Program Data Storage Area H94b includes Satellite TV Program Data Storage Area H94b1, Ground Wave TV Program Data Storage Area H94b2, Cable TV Program Data Storage Area H94b3, and Work Area H94b4. Satellite TV Program Data Storage Area H94b stores the data described hereinafter. Ground Wave TV Program Data Storage Area H94b2 stores the data described hereinafter. Cable TV Program Data Storage Area H94b3 stores the data described hereinafter. Work Area H94b4 is utilized as a work area to perform calculation and temporarily store data.

This paragraph illustrates the data stored in Satellite TV Program Data Storage Area H94b1. In this embodiment, Satellite TV Program Data Storage Area H94b1 comprises two columns, i.e., 'Satellite TV Program ID' and 'Satellite TV Program Data'. Column 'Satellite TV Program ID' stores the satellite TV program IDs, and each satellite TV program ID is an identification of the corresponding satellite TV program data stored in column 'Satellite TV Program Data'. Column 'Satellite TV Program Data' stores the satellite TV program data, and each satellite TV program data is the data received from Satellite TV Broadcast Center 94TVBC1. In this embodiment, Satellite TV Program Data Storage Area H94b1 stores the following data: the satellite TV program ID 'Satellite TV Program#1' and the corresponding satellite TV program data 'Satellite TV Program Data#1'; the satellite TV program ID 'Satellite TV Program#2' and the corresponding satellite TV program data 'Satellite TV Program Data#2'; the satellite TV program ID 'Satellite TV Program#3' and the corresponding satellite TV program data 'Satellite TV Program Data#3'; and the satellite TV program ID 'Satellite TV Program#4' and the corresponding satellite TV program data 'Satellite TV Program Data#4'.

This paragraph illustrates the data stored in Ground Wave TV Program Data Storage Area H94b2. In this embodiment, Ground Wave TV Program Data Storage Area H94b2 comprises two columns, i.e., 'Ground Wave TV Program ID' and 'Ground Wave TV Program Data'. Column 'Ground Wave TV Program ID' stores the ground wave TV program IDs, and each ground wave TV program ID is an identification of the corresponding ground wave TV program data stored in column 'Satellite TV Program Data'. Column 'Ground Wave TV Program Data' stores the ground wave TV program data, and each ground wave TV program data is the data received from Ground Wave TV Broadcast Center 94TVBC2. In this embodiment, Ground Wave TV Program Data Storage Area H94b2 stores the following data: the ground wave TV program ID 'Ground Wave TV Program#1' and the corresponding ground wave TV program data 'Ground Wave TV Program Data#1'; the ground wave TV program ID 'Ground Wave TV Program#2' and the corresponding ground wave TV program data 'Ground Wave TV Program Data#2'; the ground wave TV program ID 'Ground Wave TV Program#3' and the corresponding ground wave TV program data 'Ground Wave TV Program Data#3'; and the ground wave TV program ID 'Ground Wave TV Program#4' and the corresponding ground wave TV program data 'Ground Wave TV Program Data#4'.

This paragraph illustrates the data stored in Cable TV Program Data Storage Area H94b3. In this embodiment, Cable TV Program Data Storage Area H94b3 comprises two columns, i.e., 'Cable TV Program ID' and 'Cable TV Program Data'. Column 'Cable TV Program ID' stores the cable TV program IDs, and each cable TV program ID is an identification of the corresponding cable TV program data stored in column 'Satellite TV Program Data'. Column 'Cable TV Program Data' stores the cable TV program data, and each cable TV program data is the data received from Cable TV Broadcast Center 94TVBC3. In this embodiment, Cable TV Program Data Storage Area H94b3 stores the following data: the cable TV program ID 'Cable TV Program#1' and the corresponding cable TV program data 'Cable TV Program Data#1'; the cable TV program ID 'Cable TV Program#2' and the corresponding cable TV program data 'Cable TV Program Data#2'; the cable TV program ID 'Cable TV Program#3' and the corresponding cable TV program data 'Cable TV Program Data#3'; and the cable TV program ID 'Cable TV Program#4' and the corresponding cable TV program data 'Cable TV Program Data#4'.

This paragraph illustrates the software programs stored in Multiple Type TV Program Data Software Storage Area H94c. In this embodiment, Multiple Type TV Program Data Software Storage Area H94c stores Satellite TV Program Data Receiving Software H94c1, Ground Wave TV Program Data Receiving Software H94c2, Cable TV Program Data Receiving Software H94c3, Satellite TV Program Data Sending/Receiving Software H94c4, Ground Wave TV Program Data Sending/Receiving Software H94c5, and Cable TV Program Data Sending/Receiving Software H94c6. Satellite TV Program Data Receiving Software H94c1 is the software program described hereinafter. Ground Wave TV Program Data Receiving Software H94c2 is the software program described hereinafter. Cable TV Program Data Receiving Software H94c3 is the software program described hereinafter. Satellite TV Program Data Sending/Receiving Software H94c4 is the software program described hereinafter. Ground Wave TV Program Data Sending/Receiving Software H94c5 is the software program described hereinafter. Cable TV Program Data Sending/Receiving Software H94c6 is the software program described hereinafter.

This paragraph illustrates the storage area included in RAM 206 (FIG. 1) of Communication Device 200. In this embodiment, RAM 206 includes Multiple Type TV Program Information Storage Area 20694a of which the data and the software programs stored therein are described hereinafter.

The data and/or the software programs stored in Multiple Type TV Program Information Storage Area 20694a may be downloaded from Host H.

This paragraph illustrates the storage areas included in Multiple Type TV Program Information Storage Area 20694a. In this embodiment, Multiple Type TV Program Information Storage Area 20694a includes Multiple Type TV Program Data Storage Area 20694b and Multiple Type TV Program Data Software Storage Area 20694c. Multiple Type TV Program Data Storage Area 20694b stores the data necessary to implement the present function on the side of Communication Device 200, such as the ones described hereinafter. Multiple Type TV Program Data Software Storage Area 20694c stores the software programs necessary to implement the present function on the side of Communication Device 200, such as the ones described hereinafter.

This paragraph illustrates the storage areas included in Multiple Type TV Program Data Storage Area 20694b. In this embodiment, Multiple Type TV Program Data Storage Area 20694b includes Satellite TV Program Data Storage Area 20694b1, Ground Wave TV Program Data Storage Area 20694b2, Cable TV Program Data Storage Area 20694b3, and Work Area 20694b4. Satellite TV Program Data Storage Area 20694b1 stores the data described hereinafter. Ground Wave TV Program Data Storage Area 20694b2 stores the data described hereinafter. Cable TV Program Data Storage Area 20694b3 stores the data described hereinafter. Work Area 20694b4 is utilized as a work area to perform calculation and temporarily store data.

This paragraph illustrates the data stored in Satellite TV Program Data Storage Area 20694b1. In this embodiment, Satellite TV Program Data Storage Area 20694b1 comprises two columns, i.e., 'Satellite TV Program ID' and 'Satellite TV Program Data'. Column 'Satellite TV Program ID' stores the satellite TV program IDs, and each satellite TV program ID is an identification of the corresponding satellite TV program data stored in column 'Satellite TV Program Data'. Column 'Satellite TV Program Data' stores the satellite TV program data, and each satellite TV program data is the data received from Host H. In this embodiment, Satellite TV Program Data Storage Area 20694b1 stores the following data: the satellite TV program ID 'Satellite TV Program#1' and the corresponding satellite TV program data 'Satellite TV Program Data#1'; the satellite TV program ID 'Satellite TV Program#2' and the corresponding satellite TV program data 'Satellite TV Program Data#2'; the satellite TV program ID 'Satellite TV Program#3' and the corresponding satellite TV program data 'Satellite TV Program Data#3'; and the satellite TV program ID 'Satellite TV Program#4' and the corresponding satellite TV program data 'Satellite TV Program Data#4'.

This paragraph illustrates the data stored in Ground Wave TV Program Data Storage Area 20694b2. In this embodiment, Ground Wave TV Program Data Storage Area 20694b2 comprises two columns, i.e., 'Ground Wave TV Program ID' and 'Ground Wave TV Program Data'. Column 'Ground Wave TV Program ID' stores the ground wave TV program IDs, and each ground wave TV program ID is an identification of the corresponding ground wave TV program data stored in column 'Satellite TV Program Data'. Column 'Ground Wave TV Program Data' stores the ground wave TV program data, and each ground wave TV program data is the data received from Host H. In this embodiment, Ground Wave TV Program Data Storage Area 20694b2 stores the following data: the ground wave TV program ID 'Ground Wave TV Program#1' and the corresponding ground wave TV program data 'Ground Wave TV Program Data#1'; the ground wave TV program ID 'Ground Wave TV Program#2' and the corresponding ground wave TV program data 'Ground Wave TV Program Data#2'; the ground wave TV program ID 'Ground Wave TV Program#3' and the corresponding ground wave TV program data 'Ground Wave TV Program Data#3'; and the ground wave TV program ID 'Ground Wave TV Program#4' and the corresponding ground wave TV program data 'Ground Wave TV Program Data#4'.

This paragraph illustrates the data stored in Cable TV Program Data Storage Area 20694b3. In this embodiment, Cable TV Program Data Storage Area 20694b3 comprises two columns, i.e., 'Cable TV Program ID' and 'Cable TV Program Data'. Column 'Cable TV Program ID' stores the cable TV program IDs, and each cable TV program ID is an identification of the corresponding cable TV program data stored in column 'Satellite TV Program Data'. Column 'Cable TV Program Data' stores the cable TV program data, and each cable TV program data is the data received from Host H. In this embodiment, Cable TV Program Data Storage Area 20694b3 stores the following data: the cable TV program ID 'Cable TV Program#1' and the corresponding cable TV program data 'Cable TV Program Data#1'; the cable TV program ID 'Cable TV Program#2' and the corresponding cable TV program data 'Cable TV Program Data#2'; the cable TV program ID 'Cable TV Program#3' and the corresponding cable TV program data 'Cable TV Program Data#3'; and the cable TV program ID 'Cable TV Program#4' and the corresponding cable TV program data 'Cable TV Program Data#4'.

This paragraph illustrates the software programs stored in Multiple Type TV Program Data Software Storage Area 20694c. In this embodiment, Multiple Type TV Program Data Software Storage Area 20694c stores Satellite TV Program Data Sending/Receiving Software 20694c1, Ground Wave TV Program Data Sending/Receiving Software 20694c2, and Cable TV Program Data Sending/Receiving Software 20694c3. Satellite TV Program Data Sending/Receiving Software 20694c1 is the software program described hereinafter. Ground Wave TV Program Data Sending/Receiving Software 20694c2 is the software program described hereinafter. Cable TV Program Data Sending/Receiving Software 20694c3 is the software program described hereinafter.

This paragraph illustrates Satellite TV Program Data Receiving Software H94c1 of Host H, which receives the satellite TV program data from Satellite TV Broadcast Center 94TVBC1. In this embodiment, Host H receives the satellite TV program data (e.g., Satellite TV Program Data#1 Through #4) from Satellite TV Broadcast Center 94TVBC1 (S1). Host H stores the satellite TV program data (e.g., Satellite TV Program Data#1 Through #4) in Satellite TV Program Data Storage Area H94b1 (S2). The foregoing sequence is repeated periodically.

This paragraph illustrates Ground Wave TV Program Data Receiving Software H94c2 of Host H, which receives the ground wave TV program data from Ground Wave TV Broadcast Center 94TVBC2. In this embodiment, Host H receives the ground wave TV program data (e.g., Ground Wave TV Program Data#1 Through #4) from Ground Wave TV Broadcast Center 94TVBC2 (S1). Host H stores the ground wave TV program data (e.g., Ground Wave TV Program Data#1

Through #4) in Ground Wave TV Program Data Storage Area H94b2 (S2). The foregoing sequence is repeated periodically.

This paragraph illustrates Cable TV Program Data Receiving Software H94c3 of Host H, which receives the cable TV program data from Cable TV Broadcast Center 94TVBC3. In this embodiment, Host H receives the cable TV program data (e.g., Cable TV Program Data#1 Through #4) from Cable TV Broadcast Center 94TVBC3 (S1). Host H stores the cable TV program data (e.g., Cable TV Program Data#1 Through #4) in Cable TV Program Data Storage Area H94b3 (S2). The foregoing sequence is repeated periodically.

This paragraph illustrates Satellite TV Program Data Sending/Receiving Software H94c4 of Host H and Satellite TV Program Data Sending/Receiving Software 20694c1 of Communication Device 200, which sends and receives the satellite TV program data. In this embodiment, Host H retrieves all satellite TV program data (e.g., Satellite TV Program Data#1 Through #4) from Satellite TV Program Data Storage Area H94b1 and sends the data to Communication Device 200 (S1). CPU 211 (FIG. 1) of Communication Device 200 receives the satellite TV program data (e.g., Satellite TV Program Data#1 Through #4) from Host H via Antenna 218 (FIG. 1) (S2). CPU 211 stores the satellite TV program data (e.g., Satellite TV Program Data#1 Through #4) in Satellite TV Program Data Storage Area 20694b1 (S3). The foregoing sequence is repeated periodically.

This paragraph illustrates Ground Wave TV Program Data Sending/Receiving Software H94c5 of Host H and Ground Wave TV Program Data Sending/Receiving Software 20694c2 of Communication Device 200, which sends and receives the ground wave TV program data. In this embodiment, Host H retrieves all ground wave TV program data (e.g., Ground Wave TV Program Data#1 Through #4) from Ground Wave TV Program Data Storage Area H94b2 and sends the data to Communication Device 200 (S1). CPU 211 (FIG. 1) of Communication Device 200 receives the ground wave TV program data (e.g., Ground Wave TV Program Data#1 Through #4) from Host H (S2). CPU 211 stores the ground wave TV program data (e.g., Ground Wave TV Program Data#Through #4) in Ground Wave TV Program Data Storage Area 20694b2 (S3). The foregoing sequence is repeated periodically.

This paragraph illustrates Cable TV Program Data Sending/Receiving Software H94c6 of Host H and Cable TV Program Data Sending/Receiving Software 20694c3 of Communication Device 200, which sends and receives the cable TV program data. In this embodiment, Host H retrieves all cable TV program data (e.g., Cable TV Program Data#1 Through #4) from Cable TV Program Data Storage Area H94b3 and sends the data to Communication Device 200 (S1). CPU 211 (FIG. 1) of Communication Device 200 receives the cable TV program data (e.g., Cable TV Program Data#1 Through #4) from Host H (S2). CPU 211 stores the cable TV program data (e.g., Cable TV Program Data#1 Through #4) in Cable TV Program Data Storage Area 20694b3 (S3). The foregoing sequence is repeated periodically.

<<Multiple TV Screen Displaying Function>>

The following paragraphs illustrate the multiple TV screen displaying function which displays a plurality of TV screen on LCD 201 (FIG. 1) of Communication Device 200 wherein each TV screen displays a TV program, and the user of Communication Device 200 is enabled to select a TV program to watch therefrom.

This paragraph illustrates the storage area included in RAM 206 (FIG. 1) of Communication Device 200. In this embodiment, RAM 206 includes Multiple TV Screen Displaying Information Storage Area 20695a of which the data and the software programs stored therein are described hereinafter.

The data and/or the software programs stored in Multiple TV Screen Displaying Information Storage Area 20695a may be downloaded from Host H.

This paragraph illustrates the storage areas included in Multiple TV Screen Displaying Information Storage Area 20695a. In this embodiment, Multiple TV Screen Displaying Information Storage Area 20695a includes Multiple TV Screen Displaying Data Storage Area 20695b and Multiple TV Screen Displaying Software Storage Area 20695c. Multiple TV Screen Displaying Data Storage Area 20695b stores the data necessary to implement the present function on the side of Communication Device 200, such as the ones described hereinafter. Multiple TV Screen Displaying Software Storage Area 20695c stores the software programs necessary to implement the present function on the side of Communication Device 200, such as the ones described hereinafter.

This paragraph illustrates the storage areas included in Multiple TV Screen Displaying Data Storage Area 20695b. In this embodiment, Multiple TV Screen Displaying Data Storage Area 20695b includes TV Program Data Storage Area 20695b1, Multiple TV Screen Data Storage Area 20695b2, and Work Area 20695b3. TV Program Data Storage Area 20695b stores the data described hereinafter. Multiple TV Screen Data Storage Area 20695b2 stores the data described hereinafter. Work Area 20695b3 is utilized as a work area to perform calculation and temporarily store data.

This paragraph illustrates the data stored in TV Program Data Storage Area 20695b1. In this embodiment, TV Program Data Storage Area 20695b1 comprises two columns, i.e., 'TV Program ID' and 'TV Program Data'. Column 'TV Program ID' stores the TV program IDs, and each TV program ID is an identification of the corresponding TV program data stored in column 'TV Program Data'. Column 'TV Program Data' stores the TV program data, and each TV program data is a TV program data including audiovisual data designed to be output from LCD 201 (FIG. 1) and Speaker 216 (FIG. 1) of Communication Device 200. In this embodiment, TV Program Data Storage Area 20695b1 stores the following data: the TV program ID 'TV Program#1' and the corresponding TV program data 'TV Program Data#1'; the TV program ID 'TV Program#2' and the corresponding TV program data 'TV Program Data#2'; the TV program ID 'TV Program#3' and the corresponding TV program data 'TV Program Data#3'; and the TV program ID 'TV Program#4' and the corresponding TV program data 'TV Program Data#4'.

This paragraph illustrates the data stored in Multiple TV Screen Data Storage Area 20695b2. In this embodiment, Multiple TV Screen Data Storage Area 20695b2 comprises two columns, i.e., 'Cell ID' and 'TV Program Data Displaying Cell'. Column 'Cell ID' stores the cell IDs, and each cell ID is an identification of the corresponding TV program data displaying cell stored in column 'TV Program Data Displaying Cell'. Column 'TV Program Data Displaying Cell' stores the TV program data displaying cell, and each TV program data displaying cell is the area in which a TV program data stored in TV Program Data Storage Area 20695b1 is temporary stored and from which the TV program data is retrieved for purposes of being displayed on LCD 201 (FIG. 1) of Communication Device 200. In this embodiment, Multiple TV Screen Data Storage Area 20695b2 stores the following data: the cell ID 'Cell#1' and the corresponding TV program data displaying cell 'TV Program Data Displaying Cell#1';

the cell ID 'Cell#2' and the corresponding TV program data displaying cell 'TV Program Data Displaying Cell#2'; the cell ID 'Cell#3' and the corresponding TV program data displaying cell 'TV Program Data Displaying Cell#3'; and the cell ID 'Cell#4' and the corresponding TV program data displaying cell 'TV Program Data Displaying Cell#4'.

This paragraph illustrates the location of each TV program data displaying cell described in the previous paragraph. In this embodiment, each TV program data displaying cell is arranged in a matrix fashion.

This paragraph illustrates the software programs stored in Multiple TV Screen Displaying Software Storage Area 20695c. In this embodiment, Multiple TV Screen Displaying Software Storage Area 20695c stores Multiple TV Program Retrieving Software 20695c1, Multiple TV Program Displaying Software 20695c2, TV Program Selecting Software 20695c3, and Multiple TV Program Matrix Data Displaying Software 20695c5. Multiple TV Program Retrieving Software 20695c1 is the software program described hereinafter. Multiple TV Program Displaying Software 20695c2 is the software program described hereinafter. TV Program Selecting Software 20695c3 is the software program described hereinafter. Multiple TV Program Matrix Data Displaying Software 20695c5 is the software program described hereinafter.

This paragraph illustrates Multiple TV Program Retrieving Software 20695c1 of Communication Device 200, which retrieves all TV program data from TV Program Data Storage Area 20695b1. In this embodiment, CPU 211 (FIG. 1) of Communication Device 200 retrieves TV Program Data#1 through #4 from TV Program Data Storage Area 20695b (S1). CPU 211 stores TV Program Data#1 in TV Program Data Displaying Cell#1 of Multiple TV Screen Data Storage Area 20695b2 (S2). CPU 211 stores TV Program Data#2 in TV Program Data Displaying Cell#2 of Multiple TV Screen Data Storage Area 20695b2 (S3). CPU 211 stores TV Program Data#3 in TV Program Data Displaying Cell#3 of Multiple TV Screen Data Storage Area 20695b2 (S4). CPU 211 stores TV Program Data#4 in TV Program Data Displaying Cell#4 of Multiple TV Screen Data Storage Area 20695b2 (S5).

This paragraph illustrates the display areas at which the TV program data are displayed. In this embodiment, each TV program data stored in Multiple TV Screen Data Storage Area 20695b2 is retrieved and displayed on LCD 201 (FIG. 1) of Communication Device 200 in a matrix fashion. Namely, TV Program Data#1 stored in TV Program Data Displaying Cell#1 of Multiple TV Screen Data Storage Area 20695b2 is displayed at Display Area 20195a; TV Program Data#2 stored in TV Program Data Displaying Cell#2 of Multiple TV Screen Data Storage Area 20695b2 is displayed at Display Area 20195b; TV Program Data#3 stored in TV Program Data Displaying Cell#3 of Multiple TV Screen Data Storage Area 20695b2 is displayed at Display Area 20195c; and TV Program Data#4 stored in TV Program Data Displaying Cell#4 of Multiple TV Screen Data Storage Area 20695b2 is displayed at Display Area 20195d.

This paragraph illustrates Multiple TV Program Displaying Software 20695c2 of Communication Device 200, which displays the TV program data stored in Multiple TV Screen Data Storage Area 20695b2 in a matrix fashion. In this embodiment, CPU 211 (FIG. 1) of Communication Device 200 retrieves TV Program Data#1 from TV Program Data Displaying Cell#1 of Multiple TV Screen Data Storage Area 20695b2 and displays the data at Display Area 20195a (S1). CPU 211 retrieves TV Program Data#2 from TV Program Data Displaying Cell#2 of Multiple TV Screen Data Storage Area 20695b2 and displays the data at Display Area 20195b (S2). CPU 211 retrieves TV Program Data#3 from TV Program Data Displaying Cell#3 of Multiple TV Screen Data Storage Area 20695b2 and displays the data at Display Area 20195c (S3). CPU 211 retrieves TV Program Data#4 from TV Program Data Displaying Cell#4 of Multiple TV Screen Data Storage Area 20695b2 and displays the data at Display Area 20195d (S4).

This paragraph illustrates TV Program Selecting Software 20695c3 of Communication Device 200, which selects a TV program in order for the TV program to be displayed on LCD 201 (FIG. 1) in full screen. In this embodiment, the user of Communication Device 200 selects a display area (e.g., Display Area 20195a) by utilizing Input Device 210 (FIG. 1) or via voice recognition system (S1). CPU 211 (FIG. 1) of Communication Device 200 displays the TV program data (e.g., TV Program Data#1) displayed in display area (e.g., Display Area 20195a) selected in S1 in full screen (S2).

Multiple TV Screen Displaying Function

Another Embodiment

The following paragraphs illustrate another embodiment, wherein Host H plays a major role in implementing the present function.

This paragraph illustrates the storage area included in Host H. In this embodiment, Host H includes Multiple TV Screen Displaying Information Storage Area H95a of which the data and the software programs stored therein are described hereinafter.

This paragraph illustrates the storage areas included in Multiple TV Screen Displaying Information Storage Area H95a. In this embodiment, Multiple TV Screen Displaying Information Storage Area H95a includes Multiple TV Screen Displaying Data Storage Area H95b and Multiple TV Screen Displaying Software Storage Area H95c. Multiple TV Screen Displaying Data Storage Area H95b stores the data necessary to implement the present function on the side of Host H, such as the ones described hereinafter. Multiple TV Screen Displaying Software Storage Area H95c stores the software programs necessary to implement the present function on the side of Host H, such as the ones described hereinafter.

This paragraph illustrates the storage areas included in Multiple TV Screen Displaying Data Storage Area H95b. In this embodiment, Multiple TV Screen Displaying Data Storage Area H95b includes TV Program Data Storage Area H95b1, Multiple TV Screen Data Storage Area H95b2, and Work Area H95b3. TV Program Data Storage Area H95b1 stores the data described hereinafter. Multiple TV Screen Data Storage Area H95b2 stores the data described hereinafter. Work Area H95b3 is utilized as a work area to perform calculation and temporarily store data.

This paragraph illustrates the data stored in TV Program Data Storage Area H95b1. In this embodiment, TV Program Data Storage Area H95b1 comprises two columns, i.e., 'TV Program ID' and 'TV Program Data'. Column 'TV Program ID' stores the TV program IDs, and each TV each TV program ID is an identification of the corresponding TV program data stored in column 'TV Program Data'. Column 'TV Program Data' stores the TV program data, and each TV program data is a TV program data including audiovisual data designed to be output from LCD 201 (FIG. 1) and Speaker 216 (FIG. 1) of Communication Device 200. In this embodiment, TV Program Data Storage Area H95b1 stores the following data: the TV program ID 'TV Program#1' and the corresponding TV program data 'TV Program Data#1'; the TV program ID 'TV Program#2' and the corresponding TV program data 'TV Program Data#2'; the TV program ID 'TV Program#3' and the corresponding TV program data 'TV Program Data#3'; and the TV program ID 'TV Program#4' and the corresponding TV program data 'TV Program Data#4'.

This paragraph illustrates the data stored in Multiple TV Screen Data Storage Area H95b2. In this embodiment, Multiple TV Screen Data Storage Area H95b2 comprises two columns, i.e., 'Cell ID' and 'TV Program Data Displaying Cell'. Column 'Cell ID' stores the cell IDs, and each cell ID is an identification of the corresponding TV program data displaying cell stored in column 'TV Program Data Displaying Cell'. Column 'TV Program Data Displaying Cell' stores the TV program data displaying cell, and each TV program data displaying cell is the area in which a TV program data stored in TV Program Data Storage Area H95b1 is temporary stored and from which the TV program data is retrieved for purposes of being displayed on LCD 201 (FIG. 1) of Communication Device 200. In this embodiment, Multiple TV Screen Data Storage Area H95b2 stores the following data: the cell ID 'Cell#1' and the corresponding TV program data displaying cell 'TV Program Data Displaying Cell#1'; the cell ID 'Cell#2' and the corresponding TV program data displaying cell 'TV Program Data Displaying Cell#2'; the cell ID 'Cell#3' and the corresponding TV program data displaying cell 'TV Program Data Displaying Cell#3'; and the cell ID 'Cell#4' and the corresponding TV program data displaying cell 'TV Program Data Displaying Cell#4'.

This paragraph illustrates the location of each TV program data displaying cell described in the previous paragraph. In this embodiment, each TV program data displaying cell is arranged in a matrix fashion.

This paragraph illustrates the software programs stored in Multiple TV Screen Displaying Software Storage Area H95c. In this embodiment, Multiple TV Screen Displaying Software Storage Area H95c stores Multiple TV Program Retrieving Software H95c1, TV Program Selecting Software H95c3, Multiple TV Program Matrix Data Producing Software H95c4, and Multiple TV Program Matrix Data Displaying Software H95c5. Multiple TV Program Retrieving Software H95c1 is the software program described hereinafter. TV Program Selecting Software H95c3 is the software program described hereinafter. Multiple TV Program Matrix Data Producing Software H95c4 is the software program described hereinafter. Multiple TV Program Matrix Data Displaying Software H95c5 is the software program described hereinafter.

This paragraph illustrates Multiple TV Program Retrieving Software H95c1 of Host H, which retrieves all TV program data from TV Program Data Storage Area H95b1. In this embodiment, Host H retrieves TV Program Data#1 through #4 from TV Program Data Storage Area H95b1 (S1). Host H stores TV Program Data#1 in TV Program Data Displaying Cell#1 of Multiple TV Screen Data Storage Area H95b2 (S2). Host H stores TV Program Data#2 in TV Program Data Displaying Cell#2 of Multiple TV Screen Data Storage Area H95b2 (S3). Host H stores TV Program Data#3 in TV Program Data Displaying Cell#3 of Multiple TV Screen Data Storage Area H95b2 (S4). Host H stores TV Program Data#4 in TV Program Data Displaying Cell#4 of Multiple TV Screen Data Storage Area H95b2 (S5). The foregoing sequence is repeated periodically.

This paragraph illustrates Multiple TV Program Matrix Data Producing Software H95c4 of Host H, which displays the TV program data stored in Multiple TV Screen Data Storage Area H95b2 in a matrix fashion. In this embodiment, Host H retrieves TV Program Data#1 from TV Program Data Displaying Cell#1 of Multiple TV Screen Data Storage Area H95b2 (S1). Host H retrieves TV Program Data#2 from TV Program Data Displaying Cell#2 of Multiple TV Screen Data Storage Area H95b2 (S2). Host H retrieves TV Program Data#3 from TV Program Data Displaying Cell#3 of Multiple TV Screen Data Storage Area H95b2 (S3). Host H retrieves TV Program Data#4 from TV Program Data Displaying Cell#4 of Multiple TV Screen Data Storage Area H95b2 (S4). Host H produces a multiple TV program matrix data and stores the data in Work Area H95b3 (S5). Here, the multiple TV program matrix data is a visual data produced by composing TV Program Data#1 through #4 into one screen data designed to be displayed on LCD 201 (FIG. 1) as described hereinafter. The foregoing sequence is repeated periodically.

This paragraph illustrates Multiple TV Program Matrix Data Displaying Software H95c5 of Host H and Multiple TV Program Matrix Data Displaying Software 20695c5 of Communication Device 200, which display the multiple TV program matrix data on LCD 201 (FIG. 1). In this embodiment, Host H retrieves the multiple TV program matrix data from Work Area H95b3 and sends the data to Communication Device 200 (S1). CPU 211 (FIG. 1) of Communication Device 200 receives the multiple TV program matrix data from Host H and stores the data in Work Area 20695b3 (S2). The foregoing sequence is repeated periodically.

This paragraph illustrates the multiple TV program matrix data displayed on LCD 201 (FIG. 1). In this embodiment, the TV program data stored in Multiple TV Screen Data Storage Area H95b2 of Host H are displayed on LCD 201 (FIG. 1) of Communication Device 200 in a matrix fashion. Namely, TV Program Data#1 stored in TV Program Data Displaying Cell#1 of Multiple TV Screen Data Storage Area H95b2 is displayed at Display Area 20195a; TV Program Data#2 stored in TV Program Data Displaying Cell#2 of Multiple TV Screen Data Storage Area H95b2 is displayed at Display Area 20195b; TV Program Data#3 stored in TV Program Data Displaying Cell#3 of Multiple TV Screen Data Storage Area H95b2 is displayed at Display Area 20195c; and TV Program Data#4 stored in TV Program Data Displaying Cell#4 of Multiple TV Screen Data Storage Area H95b2 is displayed at Display Area 20195d.

This paragraph illustrates TV Program Selecting Software H95c3 of Host H and TV Program Selecting Software 20695c3 of Communication Device 200, which select a TV program in order for the TV program to be displayed on LCD 201 (FIG. 1) in full screen. In this embodiment, the user of Communication Device 200 selects a display area (e.g., Display Area 20195a) by utilizing Input Device 210 (FIG. 1) or via voice recognition system (S1). CPU 211 (FIG. 1) of Communication Device 200 sends a selected display area signal, which is received by Host H (S2). Here, the selected display area signal is a signal identifying the display area (e.g., Display Area 20195a) selected in the previous step. Host H identifies the corresponding TV program data (e.g., TV Program Data#1) and retrieves the data which is sent to Communication Device 200 (S3). CPU 211 receives the TV program data (e.g., TV Program Data#1) and stores the data in Work Area 20695b3 (S4). CPU 211 retrieves the TV program data (e.g., TV Program Data#1) from Work Area 20695b3 and displays the data on LCD 201 (FIG. 1) in full screen (S5).

<<Touch Panel Function>>

The following paragraphs illustrate the touch panel function which enables the user to operate Communication Device 200 via a touch panel. In other words, the touch panel is installed in LCD 201 (FIG. 1), and the user is enabled to operate Communication Device 200 by touching LCD 201 instead of utilizing Input Device 210 (FIG. 1) or voice recognition system.

The mechanism and/or the structure of the touch panel is primarily described in the following patents and the references cited thereof: U.S. Pat. No. 6,690,363; U.S. Pat. No. 6,690,361; U.S. Pat. No. 6,689,458; U.S. Pat. No. 6,686,909; U.S. Pat. No. 6,685,805; U.S. Pat. No. 6,680,448; U.S. Pat. No. 6,677,934; U.S. Pat. No. 6,677,542; U.S. Pat. No. 6,664,952; U.S. Pat. No. 6,664,951; U.S. Pat. No. 6,664,950; U.S. Pat. No. 6,661,406; U.S. Pat. No. 6,654,006; U.S. Pat. No. 6,646,634; U.S. Pat. No. 6,639,587; U.S. Pat. No. 6,639,163; U.S. Pat. No. 6,633,280; U.S. Pat. No. 6,633,279; U.S. Pat. No. 6,630,058; U.S. Pat. No. 6,629,833; U.S. Pat. No. 6,628,271; U.S. Pat. No. 6,628,269; U.S. Pat. No. 6,628,268; U.S. Pat. No. 6,621,486; U.S. Pat. No. 6,611,299; U.S. Pat. No. 6,597,508; U.S. Pat. No. 6,593,917; U.S. Pat. No. 6,590,622; U.S. Pat. No. 6,583,935; U.S. Pat. No. 6,573,155; U.S. Pat. No. 6,572,941; U.S. Pat. No. 6,570,707; U.S. Pat. No. 6,567,077; U.S. Pat. No. 6,559,902; U.S. Pat. No. 6,559,834; U.S. Pat. No. 6,556,189; U.S. Pat. No. 6,552,718; U.S. Pat. No. 6,549,195; U.S. Pat. No. 6,549,193; U.S. Pat. No. 6,538,706; U.S. Pat. No. 6,538,644; U.S. Pat. No. 6,529,188; U.S. Pat. No. 6,522,322; U.S. Pat. No. 6,512,512; U.S. Pat. No. 6,507,337; U.S. Pat. No. 6,504,583; U.S. Pat. No. 6,502,668; U.S. Pat. No. 6,492,633; U.S. Pat. No. 6,480,187; and U.S. Pat. No. 6,473,235.

This paragraph illustrates the storage area included in RAM 206 (FIG. 1) of Communication Device 200. In this embodiment, RAM 206 includes Touch Panel Information Storage Area 20696a of which the data and the software programs stored therein are described hereinafter.

The data and/or the software programs stored in Touch Panel Information Storage Area 20696a may be downloaded from Host H.

This paragraph illustrates the storage areas included in Touch Panel Information Storage Area 20696a. In this embodiment, Touch Panel Information Storage Area 20696a includes Touch Panel Data Storage Area 20696b and Touch Panel Software Storage Area 20696c. Touch Panel Data Storage Area 20696b stores the data necessary to implement the present function. Touch Panel Software Storage Area 20696c stores the software programs necessary to implement the present function.

This paragraph illustrates the storage areas included in Touch Panel Data Storage Area 20696b. In this embodiment, Touch Panel Data Storage Area 20696b includes Keyboard Displaying Area Image Data Storage Area 20696b1, Font Data Storage Area 20696b2, Color Data Storage Area 20696b3, Movable Image Data Storage Area 20696b4, and Work Area 20696b5. Keyboard Displaying Area Image Data Storage Area 20696b1 stores the keyboard displaying area image data. Here, the keyboard displaying area image data is the image data of Keyboard Displaying Area 20196a2 described hereinafter. Font Data Storage Area 20696b2 stores the data described hereinafter. Color Data Storage Area 20696b3 stores the data described hereinafter. Movable Image Data Storage Area 20696b4 stores the data described hereinafter. Work Area 20696b5 is utilized as a work area to perform calculation and temporarily store data.

This paragraph illustrates the storage areas included in Font Data Storage Area 20696b2. In this embodiment, Font Data Storage Area 20696b2 includes Alphabet Key Font Data Storage Area 20696b2a and Numeric Key Font Data Storage Area 20696b2b. Alphabet Key Font Data Storage Area 20696b2a stores the data described hereinafter. Numeric Key Font Data Storage Area 20696b2b stores the data described hereinafter.

This paragraph illustrates the data stored in Alphabet Key Font Data Storage Area 20696b2a. In this embodiment, Alphabet Key Font Data Storage Area 20696b2a stores the alphabet key font data, and each alphabet key font data represents a specific font of an alphabet. In the present example, Alphabet Key Font Data Storage Area 20696b2a stores the alphabet key font data of the following alphabets: 'A', 'B', 'C', 'D', 'E', 'F', 'G', 'H', 'I', 'J', 'K', 'L', 'M', 'N', 'O', 'P', 'Q', 'R', 'S', 'T', 'U', 'V', 'W', 'X', 'Y', and 'Z'.

This paragraph illustrates the data stored in Numeric Key Font Data Storage Area 20696b2b. In this embodiment, Numeric Key Font Data Storage Area 20696b2b stores the numeric key font data, and each numeric key font data represents a specific font of a numeric figure. In the present example, Numeric Key Font Data Storage Area 20696b2b stores the numeric key font data of the following figures: '1', '2', '3', '4', '5', '6', '7', '8', '9', and '0'.

This paragraph illustrates the data stored in Color Data Storage Area 20696b3. In this embodiment, Color Data Storage Area 20696b3 comprises two columns, i.e., 'Color ID' and 'Color Data'. Column 'Color ID' stores the color IDs, and each color ID is an identification of the corresponding color data stored in column 'Color Data'. Column 'Color Data' stores the color data, and each color data represents the color of a font displayed on LCD 201. In this embodiment, Color Data Storage Area 20696b3 stores the following data: the color ID 'Color#1' and the corresponding color data 'Color Data#1'; the color ID 'Color#2' and the corresponding color data 'Color Data#2'; the color ID 'Color#3' and the corresponding color data 'Color Data#3'; and the color ID 'Color#4' and the corresponding color data 'Color Data#4'. In the present example, the color data 'Color Data#1' represents the color 'black'; the color data 'Color Data#2' represents the color 'blue'; the color data 'Color Data#3' represents the color 'green'; and the color data 'Color Data#4' represents the color 'yellow'.

This paragraph illustrates the data stored in Movable Image Data Storage Area 20696b4. In this embodiment, Movable Image Data Storage Area 20696b4 comprises two columns, i.e., 'Movable Image ID' and 'Movable Image Data'. Column 'Movable Image ID' stores the movable image IDs, and each movable image ID is an identification of the corresponding movable image data stored in column 'Movable Image Data'. Column 'Movable Image Data' stores the movable image data, and each movable image data is an image data which moves within LCD 201 by implementing the present function or utilizing Input Device 210 (FIG. 1) or via voice recognition system. In this embodiment, Movable Image Data Storage Area 20696b4 stores the following data: the movable image ID 'Movable Image#1' and the corresponding movable image data 'Movable Image Data#1'; and the movable image ID 'Movable Image#2' and the corresponding movable image data 'Movable Image Data#2'. In the present example, Movable Image Data#1 represents an image of a mouse pointer, and Movable Image Data#2 represents an image of a cursor.

This paragraph illustrates the displaying areas displayed on LCD 201 (FIG. 1). In this embodiment, two areas are displayed on LCD 201, i.e., Alphanumeric Data Displaying Area 20196a1 and Keyboard Displaying Area 20196a2. Alphanumeric Data Displaying Area 20196a1 is the area where alphanumeric data input by utilizing the present function or by utilizing Input Device 210 (FIG. 1) or via voice recognition system are displayed (e.g., the area displayed in MS Word, Word Pad, and Note Pad). Keyboard Displaying Area 20196*a*2 is the area where an image of a keyboard is displayed as described hereinafter.

This paragraph illustrates the displaying areas included in Keyboard Displaying Area 20196*a*2. In this embodiment, Keyboard Displaying Area 20196*a*2 includes Alphabet Key Displaying Area 20196*b*, Numeric Key Displaying Area 20196*c*, and Color Palette Displaying Area 20196*d*. Alphabet Key Displaying Area 20196*b* is further described hereinafter. Numeric Key Displaying Area 20196*c* is further described hereinafter. Color Palette Displaying Area 20196*d* is further described hereinafter.

This paragraph illustrates the displaying areas included in Alphabet Key Displaying Area 20196*b*. In this embodiment, Alphabet Key Displaying Area 20196*b* includes a plurality of key displaying areas, and each key displaying area represents a specific alphabet key. In the present example, Alphabet Key Displaying Area 20196*b* includes 'A' Key Displaying Area 20196*b*1 which represents the letter 'A'; 'B' Key Displaying Area 20196*b*2 which represents the letter 'B'; 'C' Key Displaying Area 20196*b*3 which represents the letter 'C'; 'D' Key Displaying Area 20196*b*4 which represents the letter 'D'; 'E' Key Displaying Area 20196*b*5 which represents the letter 'E'; 'F' Key Displaying Area 20196*b*6 which represents the letter 'F'; 'G' Key Displaying Area 20196*b*7 which represents the letter 'G'; 'H' Key Displaying Area 20196*b*8 which represents the letter 'H'; 'I' Key Displaying Area 20196*b*9 which represents the letter 'I'; 'J' Key Displaying Area 20196*b*10 which represents the letter 'J'; 'K' Key Displaying Area 20196*b*11 which represents the letter 'K'; 'L' Key Displaying Area 20196*b*12 which represents the letter 'L'; 'M' Key Displaying Area 20196*b*13 which represents the letter 'M'; 'N' Key Displaying Area 20196*b*14 which represents the letter 'N'; 'O' Key Displaying Area 20196*b*15 which represents the letter 'O'; 'P' Key Displaying Area 20196*b*16 which represents the letter 'P'; 'Q' Key Displaying Area 20196*b*17 which represents the letter 'Q'; 'R' Key Displaying Area 20196*b*18 which represents the letter 'R'; 'S' Key Displaying Area 20196*b*19 which represents the letter 'S'; 'T' Key Displaying Area 20196*b*20 which represents the letter 'T'; 'U' Key Displaying Area 20196*b*21 which represents the letter 'U'; 'V' Key Displaying Area 20196*b*22 which represents the letter 'V'; 'W' Key Displaying Area 20196*b*23 which represents the letter 'W'; 'X' Key Displaying Area 20196*b*24 which represents the letter 'X'; 'Y' Key Displaying Area 20196*b*25 which represents the letter 'Y'; and 'Z' Key Displaying Area 20196*b*26 which represents the letter 'Z'. In the present example, the letter 'A' is input to Communication Device 200 and displayed in Alphanumeric Data Displaying Area 20196*a*1 when 'A' Key Displaying Area 20196*b*1 is touched by the user; the letter 'B' is input to Communication Device 200 and displayed in Alphanumeric Data Displaying Area 20196*a*1 when 'B' Key Displaying Area 20196*b*2 is touched by the user; the letter 'C' is input to Communication Device 200 and displayed in Alphanumeric Data Displaying Area 20196*a*1 when 'C' Key Displaying Area 20196*b*3 is touched by the user; the letter 'D' is input to Communication Device 200 and displayed in Alphanumeric Data Displaying Area 20196*a*1 when 'D' Key Displaying Area 20196*b*4 is touched by the user; the letter 'E' is input to Communication Device 200 and displayed in Alphanumeric Data Displaying Area 20196*a*1 when 'E' Key Displaying Area 20196*b*5 is touched by the user; the letter 'F' is input to Communication Device 200 and displayed in Alphanumeric Data Displaying Area 20196*a*1 when 'F' Key Displaying Area 20196*b*6 is touched by the user; the letter 'G' is input to Communication Device 200 and displayed in Alphanumeric Data Displaying Area 20196*a*1 when 'G' Key Displaying Area 20196*b*7 is touched by the user; the letter 'H' is input to Communication Device 200 and displayed in Alphanumeric Data Displaying Area 20196*a*1 when 'H' Key Displaying Area 20196*b*8 is touched by the user; the letter 'I' is input to Communication Device 200 and displayed in Alphanumeric Data Displaying Area 20196*a*1 when 'I' Key Displaying Area 20196*b*9 is touched by the user; the letter 'J' is input to Communication Device 200 and displayed in Alphanumeric Data Displaying Area 20196*a*1 when 'J' Key Displaying Area 20196*b*10 is touched by the user; the letter 'K' is input to Communication Device 200 and displayed in Alphanumeric Data Displaying Area 20196*a*1 when 'K' Key Displaying Area 20196*b*11 is touched by the user; the letter 'L' is input to Communication Device 200 and displayed in Alphanumeric Data Displaying Area 20196*a*1 when 'L' Key Displaying Area 20196*b*12 is touched by the user; the letter 'M' is input to Communication Device 200 and displayed in Alphanumeric Data Displaying Area 20196*a*1 when 'M' Key Displaying Area 20196*b*13 is touched by the user; the letter 'N' is input to Communication Device 200 and displayed in Alphanumeric Data Displaying Area 20196*a*1 when 'N' Key Displaying Area 20196*b*14 is touched by the user; the letter 'O' is input to Communication Device 200 and displayed in Alphanumeric Data Displaying Area 20196*a*1 when 'O' Key Displaying Area 20196*b*15 is touched by the user; the letter 'P' is input to Communication Device 200 and displayed in Alphanumeric Data Displaying Area 20196*a*1 when 'P' Key Displaying Area 20196*b*16 is touched by the user; the letter 'Q' is input to Communication Device 200 and displayed in Alphanumeric Data Displaying Area 20196*a*1 when 'Q' Key Displaying Area 20196*b*17 is touched by the user; the letter 'R' is input to Communication Device 200 and displayed in Alphanumeric Data Displaying Area 20196*a*1 when 'R' Key Displaying Area 20196*b*18 is touched by the user; the letter 'S' is input to Communication Device 200 and displayed in Alphanumeric Data Displaying Area 20196*a*1 when 'S' Key Displaying Area 20196*b*19 is touched by the user; the letter 'T' is input to Communication Device 200 and displayed in Alphanumeric Data Displaying Area 20196*a*1 when 'T' Key Displaying Area 20196*b*20 is touched by the user; the letter 'U' is input to Communication Device 200 and displayed in Alphanumeric Data Displaying Area 20196*a*1 when 'U' Key Displaying Area 20196*b*21 is touched by the user; the letter 'V' is input to Communication Device 200 and displayed in Alphanumeric Data Displaying Area 20196*a*1 when 'V' Key Displaying Area 20196*b*22 is touched by the user; the letter 'W' is input to Communication Device 200 and displayed in Alphanumeric Data Displaying Area 20196*a*1 when 'W' Key Displaying Area 20196*b*23 is touched by the user; the letter 'X' is input to Communication Device 200 and displayed in Alphanumeric Data Displaying Area 20196*a*1 when 'X' Key Displaying Area 20196*b*24 is touched by the user; the letter 'Y' is input to Communication Device 200 and displayed in Alphanumeric Data Displaying Area 20196*a*1 when 'Y' Key Displaying Area 20196*b*25 is touched by the user; and the letter 'Z' is input to Communication Device 200 and displayed in Alphanumeric Data Displaying Area 20196*a*1 when 'Z' Key Displaying Area 20196*b*26 is touched by the user.

This paragraph illustrates the displaying areas included in Numeric Key Displaying Area 20196*c*. In this embodiment, Numeric Key Displaying Area 20196*c* includes a plurality of key displaying areas, and each key displaying area represents a specific numeric key. In the present example, Numeric Key Displaying Area 20196*c* includes '1' Key Displaying Area 20196*c*1 which represents the figure '1'; '2' Key Displaying Area 20196*c*2 which represents the figure '2'; '3' Key Displaying Area 20196*c*3 which represents the figure '3'; '4' Key Displaying Area 20196c4 which represents the figure '4'; '5' Key Displaying Area 20196c5 which represents the figure '5'; '6' Key Displaying Area 20196c6 which represents the figure '6'; '7' Key Displaying Area 20196c7 which represents the figure '7'; '8' Key Displaying Area 20196c8 which represents the figure '8'; '9' Key Displaying Area 20196c9 which represents the figure '9'; and '0' Key Displaying Area 20196c10 which represents the figure '0'. In the present example, the figure '1' is input to Communication Device 200 and displayed in Alphanumeric Data Displaying Area 20196a1 when '1' Key Displaying Area 20196c is touched by the user; the figure '2' is input to Communication Device 200 and displayed in Alphanumeric Data Displaying Area 20196a1 when '2' Key Displaying Area 20196c2 is touched by the user; the figure '3' is input to Communication Device 200 and displayed in Alphanumeric Data Displaying Area 20196a1 when '3' Key Displaying Area 20196c3 is touched by the user; the figure '4' is input to Communication Device 200 and displayed in Alphanumeric Data Displaying Area 20196a1 when '4' Key Displaying Area 20196c4 is touched by the user; the figure '5' is input to Communication Device 200 and displayed in Alphanumeric Data Displaying Area 20196a1 when '5' Key Displaying Area 20196c5 is touched by the user; the figure '6' is input to Communication Device 200 and displayed in Alphanumeric Data Displaying Area 20196a1 when '6' Key Displaying Area 20196c6 is touched by the user; the figure '7' is input to Communication Device 200 and displayed in Alphanumeric Data Displaying Area 20196a1 when '7' Key Displaying Area 20196c7 is touched by the user; the figure '8' is input to Communication Device 200 and displayed in Alphanumeric Data Displaying Area 20196a1 when '8' Key Displaying Area 20196c8 is touched by the user; the figure '9' is input to Communication Device 200 and displayed in Alphanumeric Data Displaying Area 20196a1 when '9' Key Displaying Area 20196c9 is touched by the user; and the figure '0' is input to Communication Device 200 and displayed in Alphanumeric Data Displaying Area 20196a1 when '0' Key Displaying Area 20196c10 is touched by the user.

This paragraph illustrates the displaying area included in Color Palette Displaying Area 20196d. In this embodiment, Color Palette Displaying Area 20196d includes a plurality of palette displaying areas, and each palette displaying area represents a specific color. In the present example, Color Palette Displaying Area 20196d includes Black Color Displaying Area 20196d1 which represents the color 'black'; Blue Color Displaying Area 20196d2 which represents the color 'blue'; Green Color Displaying Area 20196d3 which represents the color 'green'; and Yellow Color Displaying Area 20196d4 which represents the color 'yellow'. In the present example, the color 'black' is selected when Black Color Displaying Area 20196d1 is touched by the user; the color 'blue' is selected when Blue Color Displaying Area 20196d2 is touched by the user; the color 'green' is selected when Green Color Displaying Area 20196d3 is touched by the user; and the color 'yellow' is selected when Yellow Color Displaying Area 20196d4; is touched by the user.

This paragraph illustrates the software programs stored in Touch Panel Software Storage Area 20696c. In this embodiment, Touch Panel Software Storage Area 20696c stores Keyboard Displaying Area Image Data Outputting Software 20696c1, Key Data Inputting Software 20696c2, Mouse Pointer Moving Software 20696c3, and Font Color Changing Software 20696c4. Keyboard Displaying Area Image Data Outputting Software 20696c1 is the software program described hereinafter. Key Data Inputting Software 20696c2 is the software program described hereinafter. Mouse Pointer Moving Software 20696c3 is the software program described hereinafter. Font Color Changing Software 20696c4 is the software program described hereinafter.

This paragraph illustrates Keyboard Displaying Area Image Data Outputting Software 20696c1 of Communication Device 200, which displays Keyboard Displaying Area 20196a2 on LCD 201 as described hereinbefore. In this embodiment, the user of Communication Device 200 inputs a keyboard displaying signal (S1). Here, the keyboard displaying signal is a signal input by the user of Communication Device 200 indicating to display Keyboard Displaying Area 20196a2 on LCD 201. In response, CPU 211 (FIG. 1) of Communication Device 200 retrieves the keyboard displaying area image data from Keyboard Displaying Area Image Data Storage Area 20696b1 and displays the data on LCD 201 (S2).

This paragraph illustrates Key Data Inputting Software 20696c2 of Communication Device 200, which inputs key data (i.e., alphanumeric data) by implementing the present function. In this embodiment, CPU 211 (FIG. 1) of Communication Device 200 identifies the displaying area within Keyboard Displaying Area 20196a2 where the user touches (S1). CPU 211 retrieves the corresponding key font data from Font Data Storage Area 20696b2 (S2). CPU 211 identifies the default color data (e.g., Color Data#1, black) from Color Data Storage Area 20696b3 (S3). CPU 211 displays on LCD 201 the key font data retrieved in S2 with the color data (e.g., Color Data#1, black) identified in S3 (S4).

This paragraph illustrates Mouse Pointer Moving Software 20696c3 of Communication Device 200, which moves the mouse pointer displayed on LCD 201 by implementing the present function. In this embodiment, CPU 211 (FIG. 1) of Communication Device 200 identifies the location on LCD 201 where the user touches (S1). CPU 211 moves to and displays at the location identified in S1 Movable Image Data#1 (e.g., mouse pointer) stored in Movable Image Data Storage Area 20696b4 (S2).

This paragraph illustrates Font Color Changing Software 20696c4 of Communication Device 200, which changes the color of the fonts displayed on LCD 201 by implementing the present function. In this embodiment, CPU 211 (FIG. 1) of Communication Device 200 identifies the location in Alphanumeric Data Displaying Area 20196a1 where the user touches (S1). CPU 211 identifies the alphanumeric data at the location identified in S1 (S2). Next, CPU 211 identifies the location in Color Palette Displaying Area 20196d where the user touches (S3). CPU 211 identifies the color displaying area (e.g., Blue Color Displaying Area 20196d2) at the location identified in S3 (S4). CPU 211 changes the color (e.g., to blue) of the alphanumeric data identified in S2 (S5).

<<Communication Device Finding Function>>

This paragraph illustrates the storage area included in RAM 206 (FIG. 1) of Communication Device 200. In this embodiment, RAM 206 includes Communication Device Finding Information Storage Area 20697a of which the data and the software programs stored therein are described hereinafter.

The data and/or the software programs stored in Communication Device Finding Information Storage Area 20697a may be downloaded from Host H.

This paragraph illustrates the storage areas included in Communication Device Finding Information Storage Area 20697a. In this embodiment, Communication Device Finding Information Storage Area 20697a includes Communication Device Finding Data Storage Area 20697b and Communication Device Finding Software Storage Area 20697c. Communication Device Finding Data Storage Area 20697b stores the data necessary to implement the present function. Communication Device Finding Software Storage Area 20697c stores the software programs necessary to implement the present function.

This paragraph illustrates the storage areas included in Communication Device Finding Data Storage Area 20697b. In this embodiment, Communication Device Finding Data Storage Area 20697b includes User's Voice Wave Data Storage Area 20697b1, User's Voice Pattern Data Storage Area 20697b2, User's Phrase Data Storage Area 20697b3, Responding Sound Data Storage Area 20697b4, and Work Area 20697b5. User's Voice Wave Data Storage Area 20697b1 stores the user's voice wave data. Here, the user's voice wave data is the wave data of the voice of the user of Communication Device 200. User's Voice Pattern Data Storage Area 20697b2 stores the user's voice pattern data. Here, the user's voice pattern data is the voice pattern data of the user of Communication Device 200. The voice pattern data is same or similar to voice print which is unique to each user. User's Phrase Data Storage Area 20697b3 stores the user's phrase data. Here, the user's phrase data is primarily composed of alphanumeric data. The phrase data may be a word or a sentence determined by the user of Communication Device 200. In the present example, a phrase 'Where are you, Communication Device 200?' is stored in User's Phrase Data Storage Area 20697b3. Responding Sound Data Storage Area 20697b4 stores the responding sound data. Here the responding sound data is the sound data designed to be output via Speaker 216 (FIG. 1) for responding purposes. The responding sound data may be any data which may be output from Speaker 216. Work Area 20697b5 is utilized as a work area to perform calculation and temporarily store data.

This paragraph illustrates the software programs stored in Communication Device Finding Software Storage Area 20697c. In this embodiment, Communication Device Finding Software Storage Area 20697c stores User's Voice Wave Data Analyzing Software 20697c1 and Responding Sound Data Outputting Software 20697c2. User's Voice Wave Data Analyzing Software 20697c1 is the software program described hereinafter. Responding Sound Data Outputting Software 20697c2 is the software program described hereinafter.

This paragraph illustrates User's Voice Wave Data Analyzing Software 20697c1 of Communication Device 200, which retrieves the user's voice pattern data and the user's phrase data from the user's voice wave data. In this embodiment, the user of Communication Device 200 inputs the user's voice wave data via Microphone 215 (FIG. 1) (S1). CPU 211 (FIG. 1) of Communication Device 200 stores the user's voice wave data in User's Voice Wave Data Storage Area 20697b1 (S2). CPU 211 retrieves the user's voice pattern data from the user's voice wave data, and stores the data in User's Voice Pattern Data Storage Area 20697b2 (S3). CPU 211 retrieves the user's phrase data by voice recognition system, and stores the data in User's Phrase Data Storage Area 20697b3 (S4).

This paragraph illustrates Responding Sound Data Outputting Software 20697c2 of Communication Device 200, which outputs the responding sound data when a predetermined user's voice data is detected. In this embodiment, CPU 211 (FIG. 1) of Communication Device 200 retrieves the general sound data via Microphone 215 (FIG. 1) (S1). CPU 211 stores the general sound data retrieved in the previous step in Work Area 20697b5 (S2). CPU 211 retrieves the pattern data from the general sound data, and compares the data with the user's voice pattern data stored in User's Voice Pattern Data Storage Area 20697b2 (S3). If the pattern data of the general sound data substantially matches with the user's voice pattern data, CPU 211 retrieves the alphanumeric data therefrom by utilizing voice recognition system described hereinbefore (S4). CPU 211 compares the alphanumeric data retrieved in the previous step with the user's phrase data stored in User's Phrase Data Storage Area 20697b3 (S5). If the two data in the previous step substantially matches, CPU 211 retrieves the responding sound data from Responding Sound Data Storage Area 20697b4, and outputs the responding sound data from Speaker 216 (FIG. 1) with maximum volume (S6). The foregoing sequence is repeated periodically.

This paragraph illustrates Responding Sound Data Outputting Software 20697c2 of Communication Device 200, which outputs the responding sound data when a predetermined user's voice data is detected. This paragraph illustrates another embodiment of Responding Sound Data Outputting Software 20697c2 described in the previous paragraph. In this embodiment, CPU 211 (FIG. 1) of Communication Device 200 retrieves the general sound data via Microphone 215 (FIG. 1) (S1). CPU 211 stores the general sound data retrieved in the previous step in Work Area 20697b5 (S2). CPU 211 retrieves the general sound data from Work Area 20697b5, and compares the data with the user's voice wave data stored in User's Voice Wave Data Storage Area 20697b1 (S3). If the two data in the previous step substantially matches, CPU 211 retrieves the responding sound data from Responding Sound Data Storage Area 20697b4, and outputs the responding sound data from Speaker 216 (FIG. 1) with maximum volume (S4). The foregoing sequence is repeated periodically.

<<Voice Message Displaying Function>>

The following paragraphs illustrate the voice message displaying function which converts the message data, a voice data, stored by implementing the answering machine mode into text data.

This paragraph illustrates the storage area included in RAM 206 (FIG. 1) of Communication Device 200. In this embodiment, RAM 206 includes Voice Message Displaying Information Storage Area 206107a of which the data and the software programs stored therein are described hereinafter.

The data and/or the software programs stored in Voice Message Displaying Information Storage Area 206107a may be downloaded from Host H.

This paragraph illustrates the storage areas included in Voice Message Displaying Information Storage Area 206107a. In this embodiment, Voice Message Displaying Information Storage Area 206107a includes Voice Message Displaying Data Storage Area 206107b and Voice Message Displaying Software Storage Area 206107c. Voice Message Displaying Data Storage Area 206107b stores the data necessary to implement the present function. Voice Message Displaying Software Storage Area 206107c stores the software programs necessary to implement the present function.

This paragraph illustrates the storage areas included in Voice Message Displaying Data Storage Area 206107b. In this embodiment, Voice Message Displaying Data Storage Area 206107b includes Answering Machine Message Data Storage Area 206107b1, Caller's Message Data Storage Area 206107b2, Time Stamp Data Storage Area 206107b3, Text Message Data Storage Area 206107b4, and Work Area 206107b5. Answering Machine Message Data Storage Area 206107b1 stores the answering machine message data which is the voice data indicating that the user of Communication Device 200 (callee) can not answer the call and also indicating to leave a message. Caller's Message Data Storage Area 206107b2 stores the data described hereinafter. Time Stamp Data Storage Area 206107b3 stores the data described hereinafter. Text Message Data Storage Area 206107b4 stores the data described hereinafter. Work Area 206107*b*5 is utilized as a work area to perform calculation and temporarily store data.

This paragraph illustrates the data stored in Caller's Message Data Storage Area 206107*b*2. In this embodiment, Caller's Message Data Storage Area 206107*b*2 comprises two columns, i.e., 'Message ID' and 'Caller's Message Data'. Column 'Message ID' stores the message IDs, and each message ID is an identification of the corresponding caller's message data stored in column 'Caller's Message Data'. Here, the message ID may be the caller's phone number or his/her name. Column 'Caller's Message Data' stores the caller's message data, and each caller's message data is the voice data of the caller who called the user of Communication Device 200. In this embodiment, Caller's Message Data Storage Area 206107*b*2 stores the following data: the message ID 'Message#1' and the corresponding caller's message data 'Caller's Message Data#1'; the message ID 'Message#2' and the corresponding caller's message data 'Caller's Message Data#2'; the message ID 'Message#3' and the corresponding caller's message data 'Caller's Message Data#3'; and the message ID 'Message#4' and the corresponding caller's message data 'Caller's Message Data#4'.

This paragraph illustrates the data stored in Time Stamp Data Storage Area 206107*b*3. In this embodiment, Time Stamp Data Storage Area 206107*b*3 comprises two columns, i.e., 'Message ID' and 'Time Stamp Data'. Column 'Message ID' stores the message IDs, and each message ID is an identification of the corresponding time stamp data stored in column 'Time Stamp Data'. The message IDs stored in Time Stamp Data Storage Area 206107*b*3 are identical to the ones stored in Caller's Message Data Storage Area 206107*b*2. Column 'Time Stamp Data' stores the time stamp data, and each time stamp data is the data indicating the date, day, and time at which the caller's message data of the corresponding message ID is stored in Caller's Message Data Storage Area 206107*b*2. In this embodiment, Time Stamp Data Storage Area 206107*b*3 stores the following data: the message ID 'Message#1' and the corresponding time stamp data 'Time Stamp Data#1'; the message ID 'Message#2' and the corresponding time stamp data 'Time Stamp Data#2'; the message ID 'Message#3' and the corresponding time stamp data 'Time Stamp Data#3'; and the message ID 'Message#4' and the corresponding time stamp data 'Time Stamp Data#4'.

This paragraph illustrates the data stored in Text Message Data Storage Area 206107*b*4. In this embodiment, Text Message Data Storage Area 206107*b*4 comprises two columns, i.e., 'Message ID' and 'Text Message Data'. Column 'Message ID' stores the message IDs, and each Message ID is an identification of the corresponding text message data stored in column 'Text Message Data'. The message IDs stored in Text Message Data Storage Area 206107*b*4 are identical to the ones stored in Caller's Message Data Storage Area 206107*b*2. Column 'Text Message Data' stores the text message data, and each text message data is the text data to which the caller's message data of the corresponding message ID stored in Caller's Message Data Storage Area 206107*b*2 is converted by utilizing the voice recognition system. In this embodiment, Text Message Data Storage Area 206107*b*4 stores the following data: the message ID 'Message#1' and the corresponding text message data 'Text Message Data#1'; the message ID 'Message#2' and the corresponding text message data 'Text Message Data#2'; the message ID 'Message#3' and the corresponding text message data 'Text Message Data#3'; and the message ID 'Message#4' and the corresponding text message data 'Text Message Data#4'.

This paragraph illustrates the software programs stored in Voice Message Displaying Software Storage Area 206107*c*.

In this embodiment, Voice Message Displaying Software Storage Area 206107*c* stores Answering Machine Mode Implementing Software 206107*c*1, Afterwards Caller's Message Data Converting Software 206107*c*2, Text Message Data Displaying Software 206107*c*3, and Realtime Caller's Message Data Converting Software 206107*c*4. Answering Machine Mode Implementing Software 206107*c*1 is the software program described hereinafter. Afterwards Caller's Message Data Converting Software 206107*c*2 is the software program described hereinafter. Text Message Data Displaying Software 206107*c*3 is the software program described hereinafter. Realtime Caller's Message Data Converting Software 206107*c*4 is the software program described hereinafter.

This paragraph illustrates Answering Machine Mode Implementing Software 206107*c*1 of Communication Device 200, which implements the answering machine mode. In this embodiment, CPU 211 (FIG. 1) of Communication Device 200 receives signal via Antenna 218 (FIG. 1) (S1). If the signal received in S1 is the phone call signal, CPU 211 (FIG. 1) proceeds to the next step (S2). Here, the phone call signal indicates that another person (caller) is calling the user of Communication Device 200 (callee) for voice communication. CPU 211 connects the call (S3). CPU 211 retrieves the answering machine message data from Answering Machine Message Data Storage Area 206107*b*1 and outputs the data to the caller (S4). CPU 211 assigns the caller's phone number (or his/her name) as the new message ID (e.g., Message#4) (S5). CPU 211 stores the caller's message data at the message ID (e.g., Message#4) assigned in the previous step in Caller's Message Data Storage Area 206107*b*2 (S6). CPU 211 (FIG. 1) stores the current time as the time stamp data at the message ID (e.g., Message#4) assigned in the previous step in Time Stamp Data Storage Area 206107*b*3 (S7). CPU 211 disconnects the call thereafter (S8). The foregoing sequence is performed periodically.

This paragraph illustrates Afterwards Caller's Message Data Converting Software 206107*c*2 of Communication Device 200, which selects a caller's message data and converts the data to a text message data. In this embodiment, CPU 211 (FIG. 1) of Communication Device 200 retrieves all message IDs from Caller's Message Data Storage Area 206107*b*2 and displays the data on LCD 201 (FIG. 1) (S1). The user of Communication Device 200 selects by utilizing Input Device 210 (FIG. 1) or via voice recognition system a message ID (e.g., Message#1) (S2). CPU 211 outputs the corresponding caller's message data (e.g., Caller's Message Data#1) from Speaker 216 (FIG. 1) (S3). CPU 211 retrieves the corresponding time stamp data (e.g., Time Stamp Data#11) from Time Stamp Data Storage Area 206107*b*3 and displays the data on LCD 201 (FIG. 1) (S4). If a convert to text message data signal is input by utilizing Input Device 210 (FIG. 1) or via voice recognition system, CPU 211 (FIG. 1) proceeds to the next step (S5). Here, the convert to text message data signal is a signal to convert the caller's message data (e.g., Message#1) selected in S2 to the text message data (e.g., Text Message Data#1). CPU 211 converts the caller's message data (e.g., Caller's Message Data#1) of the message ID (e.g., Message#1) selected in S2 to the text message data (e.g., Text Message Data#1) and displays the data on LCD 201 (FIG. 1) (S6). CPU 211 stores the text message data (e.g., Text Message Data#1) converted in the previous step at the corresponding message ID (e.g., Message#1) in Text Message Data Storage Area 206107*b*4 (S7).

This paragraph illustrates Text Message Data Displaying Software 206107*c*3 of Communication Device 200, which displays the text message data on LCD 201 (FIG. 1). In this embodiment, CPU 211 (FIG. 1) of Communication Device 200 retrieves all message IDs from Text Message Data Storage Area 206107b4 (S1). CPU 211 retrieves all corresponding time stamp data from Time Stamp Data Storage Area 206107b3 (S2). CPU 211 retrieves all corresponding text message data (however, the first portion of each text message data (e.g., first 10 words of each text message data)) from Text Message Data Storage Area 206107b4 (S3). CPU 211 displays the data retrieved in the previous three steps on LCD 201 (FIG. 1) (S4). The user of Communication Device 200 selects by utilizing Input Device 210 (FIG. 1) or via voice recognition system a message ID (e.g., Message#1) (S5). CPU 211 retrieves the corresponding text message data (the entire data of Text Message Data#1) and the corresponding message ID (e.g., Message#1) from Text Message Data Storage Area 206107b4 (S6). CPU 211 retrieves the corresponding time stamp data (e.g., Time Stamp Data#1) from Time Stamp Data Storage Area 206107b3 (S7). CPU 211 displays the data retrieved in the previous two steps on LCD 201 (FIG. 1) (S8).

This paragraph illustrates Realtime Caller's Message Data Converting Software 206107c4 of Communication Device 200, which converts the caller's message data to text message data realtime. In this embodiment, CPU 211 (FIG. 1) of Communication Device 200 receives signal via Antenna 218 (FIG. 1) (S1). If the signal received in S1 is the phone call signal, CPU 211 (FIG. 1) proceeds to the next step (S2). Here, the phone call signal indicates that another person (caller) is calling the user of Communication Device 200 (callee) for voice communication. CPU 211 connects the call (S3). CPU 211 retrieves the answering machine message data from Answering Machine Message Data Storage Area 206107b1 and outputs the data to the caller (S4). CPU 211 assigns the caller's phone number (or his/her name) as the new message ID (e.g., Message#4) (S5). CPU 211 stores the caller's message data (e.g., Caller's Message Data#4) at the message ID (e.g., Message#4) assigned in the previous step in Caller's Message Data Storage Area 206107b2 (S6). CPU 211 stores the current time as the time stamp data (e.g., Time Stamp Data#4) at the message ID (e.g., Message#4) assigned in the previous step in Time Stamp Data Storage Area 206107b3 (S7). CPU 211 outputs the caller's message data (e.g., Caller's Message Data#4) stored in S6 from Speaker 216 (FIG. 1) (S8). CPU 211 converts the caller's message data (e.g., Caller's Message Data#4) stored in S6 to the text message data (e.g., Text Message Data#4) (S9). CPU 211 stores the text message data (e.g., Text Message Data#4) converted in the previous step at the corresponding message ID (e.g., Message#4) in Text Message Data Storage Area 206107b4 (S10). CPU 211 retrieves the text message data (e.g., Text Message Data#4) stored in the previous step from Text Message Data Storage Area 206107b4 (S11). CPU 211 retrieves the time stamp data (e.g., Time Stamp Data#4) stored in S7 from Time Stamp Data Storage Area 206107b3 (S12). CPU 211 displays the data retrieved in the previous two steps on LCD 201 (FIG. 1) (S13). CPU 211 disconnects the call thereafter (S14). The foregoing sequence is performed periodically. The data stored in the foregoing sequence may be displayed on LCD 201 by executing Text Message Data Displaying Software 206107c3.

<<Multiple Mode Implementing Function>>

The following paragraphs illustrate the multiple mode implementing function of Communication Device 200 which enables to activate and implement a plurality of modes, functions, and/or systems described in this specification simultaneously.

This paragraph illustrates the software programs stored in RAM 206 (FIG. 1) to implement the multiple mode implementing function (FIG. 1). In this embodiment, RAM 206 includes Multiple Mode Implementer Storage Area 20690a. Multiple Mode Implementer Storage Area 20690a stores Multiple Mode Implementer 20690b, Mode List Displaying Software 20690c, Mode Selecting Software 20690d, Mode Activating Software 20690e, and Mode Implementation Repeater 20690f, all of which are software programs. Multiple Mode Implementer 20690b administers the overall implementation of the present function. One of the major tasks of Multiple Mode Implementer 20690b is to administer and control the timing and sequence of Mode List Displaying Software 20690c, Mode Selecting Software 20690d, Mode Activating Software 20690e, and Mode Implementation Repeater 20690f. For example, Multiple Mode Implementer 20690b executes them in the following order: Mode List Displaying Software 20690c, Mode Selecting Software 20690d, Mode Activating Software 20690e, and Mode Implementation Repeater 20690f. Mode List Displaying Software 20690c displays on LCD 201 (FIG. 1) a list of a certain amount or all modes, functions, and/or systems explained in this specification of which the sequence is explained hereinafter. Mode Selecting Software 20690d selects a certain amount or all modes, functions, and/or systems explained in this specification of which the sequence is explained hereinafter. Mode Activating Software 20690e activates a certain amount or all modes, functions, and/or systems selected by the Mode Selecting Software 20690d of which the sequence is explained hereinafter. Mode Implementation Repeater 20690f executes Multiple Mode Implementer 20690b which reactivates Mode List Displaying Software 20690c, Mode Selecting Software 20690d, Mode Activating Software 20690e of which the sequence is explained hereinafter.

This paragraph illustrates the sequence of Mode List Displaying Software 20690c. In this embodiment, CPU 211 (FIG. 1), under the command of Mode List Displaying Software 20690c, displays a list of a certain amount or all modes, functions, and/or systems described in this specification on LCD 201 (FIG. 1).

This paragraph illustrates the sequence of Mode Selecting Software 20690d. In this embodiment, the user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690d, interprets the input signal and selects the corresponding mode, function, or system (S2).

This paragraph illustrates the sequence of Mode Activating Software 20690e. In this embodiment, CPU 211 (FIG. 1), under the command of Mode Activating Software 20690e, activates the mode, function, or system selected in S2 explained hereinbefore. CPU 211 thereafter implements the activated mode, function, or system as described in the relevant paragraphs in this specification.

This paragraph illustrates the sequence of Mode Implementation Repeater 20690f. In this embodiment, the user of Communication Device 200 inputs an input signal by utilizing Input Device 210 (FIG. 1) or via voice recognition system (S1). Once the activation of the selected mode, function, or system described hereinbefore is completed, and if the input signal indicates to repeat the process to activate another mode, function, or system (S2), CPU 211 (FIG. 1), under the command of Mode Implementation Repeater 20690f, executes Multiple Mode Implementer 20690b, which reactivates Mode List Displaying Software 20690c, Mode Selecting Software 20690d, and Mode Activating Software 20690e to activate the second mode, function, or system while the first mode, function, or system is implemented by utilizing the method of so-called 'time sharing' (S3). Mode List Displaying Software 20690c, Mode Selecting Software 20690d, and Mode Activating Software 20690e can be repeatedly executed until all modes, function, and systems displayed on LCD 201 (FIG. 1) are selected and activated. The activation of modes, functions, and/or systems is not repeated if the input signal explained in S2 so indicates.

As another embodiment, Multiple Mode Implementer 20690b, Mode List Displaying Software 20690c, Mode Selecting Software 20690d, Mode Activating Software 20690e, and Mode Implementation Repeater 20690f described hereinbefore may be integrated into one software program, Multiple Mode Implementer 20690b. In this embodiment, CPU 211 (FIG. 1), first of all, displays a list of a certain amount or all modes, functions, and/or systems described in this specification on LCD 201 (FIG. 1) (S1). Next, the user of Communication Device 200 inputs an input signal by utilizing Input Device 210 (FIG. 1) or via voice recognition system identifying one of the modes, functions, and/or systems displayed on LCD 201 (S2), and CPU 211 interprets the input signal and selects the corresponding mode, function, or system (S3). CPU 211 activates the mode, function, or system selected in S3, and thereafter implements the activated mode, function, or system as described in the relevant paragraphs in this specification (S4). Once the activation of the selected mode, function, or system described in S4 is completed, the user of Communication Device 200 inputs an input signal by utilizing Input Device 210 or via voice recognition system (S5). If the input signal indicates to repeat the process to activate another mode, function, or system (S6), CPU 211 repeats the steps S1 through S4 to activate the second mode, function, or system while the first mode, function, or system is implemented by utilizing the method so-called 'time sharing'. The steps of S1 though S4 can be repeatedly executed until all modes, function, and systems displayed on LCD 201 are selected and activated. The activation of modes, functions, and/or systems is not repeated if the input signal explained in S5 so indicates. As another embodiment, before or at the time one software program is activated, CPU 211 may, either automatically or manually (i.e., by a signal input by the user of Communication Device), terminate the other software programs already activated or prohibit other software programs to be activated while one software program is implemented in order to save the limited space of RAM 206, thereby allowing only one software program implemented at a time. For the avoidance of doubt, the meaning of each term 'mode(s)', 'function(s)', and 'system (s)' is equivalent to the others in this specification. Namely, the meaning of 'mode(s)' includes and is equivalent to that of 'function(s)' and 'system(s)', the meaning of 'function(s)' includes and is equivalent to that of 'mode(s)' and 'system(s)', and the meaning of 'system(s)' includes and is equivalent to that of 'mode(s)' and 'function(s)'. Therefore, even only mode(s) is expressly utilized in this specification, it impliedly includes function(s) and/or system(s) by its definition.

INCORPORATION BY REFERENCE

The following paragraphs and drawings described in U.S. Provisional Application No. 60/521,265, filed 2004-03-23, are incorporated to this application by reference: the preamble described in paragraph [2822] (no drawings); Communication Device 200 (Voice Communication Mode) described in paragraphs [2823] through [2828](FIGS. 1 through 2c); Voice Recognition System described in paragraphs [2829] through [2861](FIGS. 3 through 19); Positioning System described in paragraphs [2862] through [2893](FIGS. 20a through 32e); Auto Backup System described in paragraphs [2894] through [2903](FIGS. 33 through 37); Signal Amplifier described in paragraphs [2904] through [2909](FIG. 38); Audio/Video Data Capturing System described in paragraphs [2910] through [2922](FIGS. 39 through 44b); Digital Mirror Function (1) described in paragraphs [2923] through [2931] (FIGS. 44c through 44e); Caller ID System described in paragraphs [2932] through [2939](FIGS. 45 through 47); Stock Purchasing Function described in paragraphs [2940] through [2949](FIGS. 48 through 52); Timer Email Function described in paragraphs [2950] through [2956](FIGS. 53a and 53b); Call Blocking Function described in paragraphs [2957] through [2970](FIGS. 54 through 59); Online Payment Function described in paragraphs [2971] through [2980](FIGS. 60 through 64); Navigation System described in paragraphs [2981] through [3003](FIGS. 65 through 74a); Remote Controlling System described in paragraphs [3004] through [3022](FIGS. 75 through 85); Auto Emergency Calling System described in paragraphs [3023] through [3031] (FIGS. 86 and 87); Cellular TV Function described in paragraphs [3032] through [3116](FIGS. 88 through 135); 3D Video Game Function described in paragraphs [3117] through [3129](FIGS. 136 through 144); Digital Mirror Function (2) described in paragraphs [3130] through [3139] (FIGS. 145 through 155); Voice Recognition Sys—E-mail (2) described in paragraphs [3140] through [3148](FIGS. 156 through 160); Positioning System—GPS Search Engine described in paragraphs [3149] through [3191](FIGS. 161 through 182); Mobile Ignition Key Function described in paragraphs [3192] through [3214](FIGS. 183 through 201); Voice Print Authentication System described in paragraphs [3215] through [3225](FIGS. 202 through 211); Fingerprint Authentication System described in paragraphs [3226] through [3238](FIGS. 212 through 221); Auto Time Adjust Function described in paragraphs [3239] through [3243](FIGS. 222 through 224); Video/Photo Mode described in paragraphs [3244] through [3272](FIGS. 225 through 242); Call Taxi Function described in paragraphs [3273] through [3313](FIGS. 243 through 269); Shooting Video Game Function described in paragraphs [3314] through [3330](FIGS. 270 through 283); Driving Video Game Function described in paragraphs [3331] through [3344](FIGS. 284 through 294); Address Book Updating Function described in paragraphs [3345] through [3365](FIGS. 295 through 312); Batch Address Book Updating Function—With Host described in paragraphs [3366] through [3387](FIGS. 313 through 329); Batch Address Book Updating Function—Peer-To-Peer Connection described in paragraphs [3388] through [3392](FIGS. 329a through 329c); Batch Scheduler Updating Function—With Host described in paragraphs [3393] through [3416](FIGS. 330 through 350); Batch Scheduler Updating Function—Peer-To-Peer Connection described in paragraphs [3417] through [3421](FIGS. 351 and 352); Calculator Function described in paragraphs [3422] through [3427](FIGS. 353 through 356); Spreadsheet Function described in paragraphs [3428] through [3435](FIGS. 357 through 360); Word Processing Function described in paragraphs [3436] through [3451](FIGS. 361 through 373); TV Remote Controller Function described in paragraphs [3452] through [3474](FIGS. 374 through 394); CD/PC Inter-communicating Function described in paragraphs [3475] through [3499] (FIGS. 413 through 427); PDWR Sound Selecting Function described in paragraphs [3500] through [3536](FIGS. 428 through 456); Start Up Software Function described in paragraphs [3537] through [3553](FIGS. 457 through 466); Another Embodiment Of Communication Device 200 described in paragraphs [3554] through [3558](FIGS. 467a through 467d); Stereo Audio Data Output Function described in paragraphs [3559] through [3578](FIGS. 468 through 479); Stereo Visual Data Output Function described in paragraphs [3579] through [3598](FIGS. 480 through 491); Multiple Signal Processing Function described in paragraphs [3599] through [3671](FIGS. 492 through 529); Positioning System—Pin-pointing Function described in paragraphs [3672] through [3705](FIGS. 530 through 553); Artificial Satellite Host described in paragraphs [3706] through [3724] (FIGS. 554 through 567); CCD Bar Code Reader Function described in paragraphs [3725] through [3746](FIGS. 568 through 579); Online Renting Function described in paragraphs [3747] through [3824](FIGS. 580 through 633); SOS Calling Function described in paragraphs [3825] through [3845](FIGS. 634 through 645); Input Device described in paragraphs [3846] through [3851](FIGS. 646 through 650); PC Remote Controlling Function described in paragraphs [3852] through [3887](FIGS. 651 through 670); PC Remote Downloading Function described in paragraphs [3888] through [3937](FIGS. 671 through 701); Audiovisual Playback Function described in paragraphs [3938] through [3963] (FIGS. 702 through 716); Audio Playback Function described in paragraphs [3964] through [3988](FIGS. 717 through 731); Ticket Purchasing Function described in paragraphs [3989] through [4018](FIGS. 732 through 753); Remote Data Erasing Function described in paragraphs [4019] through [4048](FIGS. 754 through 774); Business Card Function described in paragraphs [4049] through [4065] (FIGS. 775 through 783); Game Vibrating Function described in paragraphs [4066] through [4076](FIGS. 784 through 786); Part-time Job Finding Function described in paragraphs [4077] through [4097](FIGS. 787 through 801); Parking Lot Finding Function described in paragraphs [4098] through [4137](FIGS. 802 through 832); Parts Upgradable Communication Device described in paragraphs [4138] through [4163](FIGS. 833a through 833x); On Demand TV Function described in paragraphs [4164] through [4194](FIGS. 834 through 855); Inter-communicating TV Function described in paragraphs [4195] through [4229](FIGS. 856 through 882); Display Controlling Function described in paragraphs [4230] through [4247](FIGS. 883 through 894); Multiple Party Communicating Function described in paragraphs [4248] through [4281](FIGS. 894a through 917); Display Brightness Controlling Function described in paragraphs [4282] through [4291](FIGS. 918 through 923); Multiple Party Pin-pointing Function described in paragraphs [4292] through [4339](FIGS. 924 through 950f); Digital Camera Function described in paragraphs [4340] through [4367](FIGS. 951 through 968); Phone Number Linking Function described in paragraphs [4368] through [4391](FIGS. 968a through 983); Multiple Window Displaying Function described in paragraphs [4392] through [4410](FIGS. 984 through 995); Mouse Pointer Displaying Function described in paragraphs [4411] through [4448](FIGS. 996through 1021); House Item Pin-pointing Function described in paragraphs [4449] through [4608](FIGS. 1022 through 1152); Membership Administrating Function described in paragraphs [4609] through [4651] (FIGS. 1153 through 1188); Keyword Search Timer Recording Function described in paragraphs [4652] through [4743] (FIGS. 1189 through 1254); Weather Forecast Displaying Function described in paragraphs [4744] through [4785](FIGS. 1255 through 1288); Multiple Language Displaying Function described in paragraphs [4786] through [4843](FIGS. 1289 through 1331); Caller's Information Displaying Function described in paragraphs [4844] through [4897](FIGS. 1332 through 1375); Communication Device Remote Controlling Function (By Phone) described in paragraphs [4898] through [4938](FIGS. 1394 through 1415); Communication Device Remote Controlling Function (By Web) described in paragraphs [4939] through [4979](FIGS. 1416 through 1437); Shortcut Icon Displaying Function described in paragraphs [4980] through [5007](FIGS. 1438 through 1455); Task Tray Icon Displaying Function described in paragraphs [5008] through [5030](FIGS. 1456 through 1470); Multiple Channel Processing Function described in paragraphs [5031] through [5078](FIGS. 1471 through 1498); Solar Battery Charging Function described in paragraphs [5079] through [5092](FIGS. 1499 through 1509); OS Updating Function described in paragraphs [5093] through [5160](FIGS. 1510 through 1575); Device Managing Function described in paragraphs [5161] through [5178] (FIGS. 1576 through 1587); Automobile Controlling Function described in paragraphs [5179] through [5227](FIGS. 1588 through 1627); OCR Function described in paragraphs [5228] through [5263](FIGS. 1628 through 1652); Real-time GPS Function described in paragraphs [5264] through [5333] (FIGS. 1653 through 1712); CCD Video Stabilizing Function described in paragraphs [5334] through [5365](FIGS. 1713 through 1736); DVD Remote Controlling Function described in paragraphs [5366] through [5404](FIGS. 1737 through 1757); Dual Frame Buffer Implementing Function described in paragraphs [5405] through [5421](FIGS. 1758 through 1767); Mouse Pointer Image Auto Changing Function described in paragraphs [5422] through [5435](FIGS. 1768 through 1774); Dual CCD Camera Function described in paragraphs [5436] through [5456](FIGS. 1775a through 1786); Radio Tuner Function described in paragraphs [5457] through [5487](FIGS. 1787 through 1812); Registered Voice Recognizing Function described in paragraphs [5488] through [5527](FIGS. 1813 through 1842); Host's TV Resolution Converting Function described in paragraphs [5528] through [5557](FIGS. 1843 through 1864); Voice Shortcut Recognizing Function described in paragraphs [5558] through [5592](FIGS. 1865 through 1889); Vital Sign Monitoring Function described in paragraphs [5593] through [5682](FIGS. 1890a through 1954); Attached File Emailing Function described in paragraphs [5683] through [5695](FIGS. 1955 through 1961); Movie eTicket Function described in paragraphs [5696] through [5748](FIGS. 1962 through 2002); Carrier Prepaid eCard Function described in paragraphs [5749] through [5789](FIGS. 2003 through 2032); Carrier ePass Function described in paragraphs [5790] through [5829](FIGS. 2033 through 2061b); Communication Device 200 Installed In Carrier described in paragraphs [5830] through [5831](FIG. 2062); Wireless Communication Facilitating System described in paragraphs [5832] through [5861](FIGS. 2063 through 2076b); In-Carrier Notifying Function described in paragraphs [5862] through [5892](FIGS. 2077 through 2093); Station Name Notifying Function described in paragraphs [5893] through [5922](FIGS. 2094 through 2110); Restaurant eMenu Function described in paragraphs [5923] through [5965](FIGS. 2111 through 2144); Geographic Location Recording Function described in paragraphs [5966] through [6007](FIGS. 2145 through 2176b); CCD Dictionary Function described in paragraphs [6008] through [6032](FIGS. 2177 through 2195b); Schedule Notifying Function described in paragraphs [6033] through [6059](FIGS. 2196 through 2215); Customized Device Purchasing System described in paragraphs [6060] through [6100](FIGS. 2216 through 2250); Multiple Type TV Program Distributing System described in paragraphs [6101] through [6131](FIGS. 2251 through 2274); Multiple TV Screen Displaying Function described in paragraphs [6132] through [6163](FIGS. 2275 through 2297); Touch Panel Function described in paragraphs [6164] through [6189](FIGS. 2298 through 2315); Communication Device Finding Function described in paragraphs [6190] through [6201](FIGS. 2316 through 2322); Carrier Safety Measure Controlling Function described in paragraphs [6202] through [6236](FIGS. 2323 through 2342); Product Information Retrieving Function (CCD) described in paragraphs [6237] through [6265](FIGS. 2343 through 2360); Product Information Stored Chip Function described in paragraphs [6266] through [6303](FIGS. 2361 through 2385); Karaoke Playing Function described in paragraphs [6304] through [6332](FIGS. 2386 through 2406); Performing Pattern Identifying Anti-Virus Function described in paragraphs [6333] through [6355](FIGS. 2407 through 2421); Continue Enabled Video Game Function described in paragraphs [6356] through [6378](FIGS. 2422 through 2436); Resume Enabled Video Game Function described in paragraphs [6379] through [6401](FIGS. 2437 through 2451); Signal Forwarding Function described in paragraphs [6402] through [6430](FIGS. 2452 through 2472); In-Carrier Auto Implementing Mode Function described in paragraphs [6431] through [6460](FIGS. 2473 through 2492); Voice Message Displaying Function described in paragraphs [6461] through [6481](FIGS. 2493 through 2503c); Human Toes Displaying Function described in paragraphs [6482] through [6499](FIGS. 2504 through 2521); Wrinkles/Muscles Displaying Function described in paragraphs [6500] through [6541](FIGS. 2522a through 2552e); Protruded Body Part Displaying Function described in paragraphs [6542] through [6561](FIGS. 2553 through 2566b); Satellite TV Program Displaying Function described in paragraphs [6562] through [6606](FIGS. 2567 through 2601); Definition of Communication Device 200 described in paragraphs [6607] through [6608](no drawings); Multiple Mode Implementing Function described in paragraphs [6610] through [6617](FIGS. 395 through 400); Multiple Software Download Function described in paragraphs [6618] through [6627](FIGS. 401 through 407); Selected Software Distributing Function described in paragraphs [6628] through [6647](FIGS. 1376 through 1393d); Multiple Software Download And Mode Implementation Function described in paragraphs [6648] through [6655](FIGS. 408 through 412); and the last sentence described in paragraph [6657](no drawings).

The invention claimed is:

1. A method for a communication device comprising a microphone, a speaker, an input device, a display, a camera, a touch panel, and an antenna, said method comprising:
a function implementing step at which one or more functions are implemented;
wherein said communication device is operable to implement a voice communicating function, an attached file emailing function, a geographic location function, a dictionary function, a schedule notifying function, a multiple type TV program function, a multiple TV screen displaying function, a touch panel function, a communication device finding function, and a voice message displaying function, independently or simultaneously;
voice communication is implemented by utilizing said microphone and said speaker, when said voice communicating function is implemented in said step;
an email is sent with a file attached thereto, when said attached file emailing function is implemented in said step;
a communication device geographic location which indicates the geographic location of said communication device is indicated on a map displayed on said display, a corresponding street address which corresponds to said communication device geographic location is displayed on said display, and a corresponding phone number which corresponds to said communication device geographic location or said corresponding street address is displayed on said display, when said geographic location function is implemented in said step;
an image is retrieved via said camera of said communication device, an alphanumeric data is retrieved from said image, and an explanation data corresponding to said alphanumeric data is displayed on said display, when said dictionary function is implemented in said step;
a notice is displayed on said display when a schedule is about to start, when said schedule notifying function is implemented in said step;
a satellite TV program data is received via said antenna and output from said speaker and said display under a 1st mode, and a ground wave TV program data is received via said antenna and output from said speaker and said display under a 2nd mode, when said multiple type TV program function is implemented in said step;
a plurality of TV screens are displayed on said display, wherein said plurality of TV screens include a 1st cell and a 2nd cell, a 1st TV program data and a 2nd TV program data are received via said antenna and said 1st TV program data of a shrunk version is displayed in said 1st cell and said 2nd TV program data of a shrunk version is displayed in said 2nd cell simultaneously, when said 1st cell is selected by said input device, said 1st TV program data of a non-shrunk version is displayed on said display, and when said 2nd cell is selected by said input device, said 2nd TV program data of a non-shrunk version is displayed on said display, when said multiple TV screen displaying function is implemented in said step, wherein each of the TV program data of the non-shrunk version is an image larger in size than the corresponding TV program data of the shrunk version;
said communication device is operated via said touch panel, when said touch panel function is implemented in said step;
when said communication device detects a predetermined audio data via said microphone, said communication device responds by outputting a responding sound data, which is a certain sound data, from said speaker in order to assist the user to find the location of said communication device, when said communication device finding function is implemented in said step; and
a caller's voice message, which is an audio data, is retrieved and converted to a text data, and said text data is displayed on said display, when said voice message displaying function is implemented in said step.

2. A communication device comprising:
a microphone;
a speaker;
an input device;
a display;
a camera;
a touch panel;

a voice communicating implementer, wherein voice communication is implemented by utilizing said microphone and said speaker;

an attached file emailing implementer, wherein an email is sent with a file attached thereto;

a geographic location implementer, wherein a communication device geographic location which indicates the geographic location of said communication device is indicated on a map displayed on said display;

a dictionary implementer, wherein an image is retrieved via said camera of said communication device, an alphanumeric data is retrieved from said image, and an explanation data corresponding to said alphanumeric data is displayed on said display;

a schedule notifying implementer, wherein a notice is displayed on said display when a schedule is about to start;

a multiple type TV program implementer, wherein a satellite TV program data is received via and output from said speaker and said display under a 1st mode, and a ground wave TV program data is received via and output from said speaker and said display under a 2nd mode;

a multiple TV screen displaying implementer, wherein a plurality of TV screens are displayed on said display, wherein said plurality of TV screens include a 1st cell and a 2nd cell, a 1st TV program data and a 2nd TV program data are received via said antenna and said 1st TV program data of a shrunk version is displayed in said 1st cell and said 2nd TV program data of a shrunk version is displayed in said 2nd cell simultaneously, when said 1st cell is selected by said input device, said 1st TV program data of a non-shrunk version is displayed on said display, and when said 2nd cell is selected by said input device, said 2nd TV program data of a non-shrunk version is displayed on said display, wherein each of the TV program data of the non-shrunk version is an image larger in size than the corresponding TV program data of the shrunk version;

a touch panel implementer, wherein said communication device is operated via said touch panel;

a communication device finding implementer, wherein when said communication device detects a predetermined audio data via said microphone, said communication device responds by outputting a responding sound data, which is a certain sound data, from said speaker in order to assist the user to find the location of said communication device; and a voice message displaying implementer, wherein a caller's voice message, which is an audio data, is retrieved and converted to a text data, and said text data is displayed on said display.

3. A system comprising:

a communication device comprising a microphone, a speaker, an input device, a display, a camera, a touch panel, and an antenna;

a voice communicating implementer, wherein voice communication is implemented by utilizing said microphone and said speaker;

an attached file emailing implemener, wherein an email is sent with a file attached thereto;

a geographic location implementer, wherein a communication device geographic location which indicates the geographic location of said communication device is indicated on a map displayed on said display;

a dictionary implementer, wherein an image is retrieved via said camera of said communication device, an alphanumeric data is retrieved from said image, and an explanation data corresponding to said alphanumeric data is displayed on said display;

a schedule notifying implementer, wherein a notice is displayed on said display when a schedule is about to start;

a multiple type TV program implementer, wherein a satellite TV program data is received and output from said speaker and said display under a 1st mode, and a ground wave TV program data is received and output from said speaker and said display under a 2nd mode;

a multiple TV screen displaying implementer, wherein a plurality of TV screens are displayed on said display, wherein said plurality of TV screens include a 1s cell and a 2nd cell, a 1st TV program data and a 2nd TV program data are received via said antenna and said 1st TV program data of a shrunk version is displayed in said 1st cell and said 2nd TV program data of a shrunk version is displayed in said 2nd cell simultaneously, when said 1st cell is selected by said input device, said 1st TV program data of a non-shrunk version is displayed on said display, and when said 2nd cell is selected by said input device, said 2nd TV program data of a non-shrunk version is displayed on said display, wherein each of the TV program data of the non-shrunk version is an image larger in size than the corresponding TV program data of the shrunk version;

a touch panel implementer, wherein said communication device is operated via said touch panel;

a communication device finding implementer, wherein when said communication device detects a predetermined audio data via said microphone, said communication device responds by outputting a responding sound data, which is a certain sound data, from said speaker in order to assist the user to find the location of said communication device; and a voice message displaying implementer, wherein a caller's voice message, which is an audio data, is retrieved and converted to a text data, and said text data is displayed on said display.

* * * * *